(12) United States Patent
Rolle et al.

(10) Patent No.: US 12,488,145 B2
(45) Date of Patent: Dec. 2, 2025

(54) ENABLING CUSTOMIZATIONS TO A DATA PRIVACY INTEGRATION SERVICE

(71) Applicant: SAP SE, Walldorf (DE)

(72) Inventors: Benny Rolle, Reinhardshagen (DE);
Matthias Vogel, Saarbrücken (DE);
Stefan Hesse, Dresden (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 18/629,100

(22) Filed: Apr. 8, 2024

(65) Prior Publication Data

US 2025/0315550 A1   Oct. 9, 2025

(51) Int. Cl.
G06F 21/62 (2013.01)
G06F 21/60 (2013.01)

(52) U.S. Cl.
CPC ........ G06F 21/6245 (2013.01); G06F 21/604 (2013.01)

(58) Field of Classification Search
CPC ............................ G06F 21/6245; G06F 21/604
USPC .......................................................... 726/27
See application file for complete search history.

(56) References Cited

U.S. PATENT DOCUMENTS

| 17,186 A | 5/1857 | Atwater |
|---|---|---|
| 17,457 A | 6/1857 | Tidgewell |
| 7,308,704 B2 | 12/2007 | Vogel et al. |
| 7,350,237 B2 | 3/2008 | Vogel et al. |
| 7,831,567 B2 | 11/2010 | Luther et al. |
| 8,566,193 B2 | 10/2013 | Singh et al. |
| 9,043,874 B2 | 5/2015 | Riley |
| 9,286,301 B2 | 3/2016 | Motoyama |
| 9,405,429 B1 | 8/2016 | Gopalakrishnan |
| 9,569,869 B2 | 2/2017 | Hesse et al. |

(Continued)

FOREIGN PATENT DOCUMENTS

| CA | 3096061 | 4/2023 | |
|---|---|---|---|
| CN | 110866277 A | * 3/2020 | ......... G06F 21/6245 |

(Continued)

OTHER PUBLICATIONS

U.S. Appl. No. 17/186,934, filed Feb. 26, 2021, Rolle et al.

(Continued)

*Primary Examiner* — Zi Ye
(74) *Attorney, Agent, or Firm* — Fish & Richardson P.C.

(57) ABSTRACT

The present disclosure involves systems, software, and computer implemented methods for custom processing in data privacy integration protocols. One example method includes a customer of a data privacy integration (DPI) service providing custom logic for customizing the DPI service. The DPI service generates and sends a DPI work package in response to receiving a DPI protocol request from the customer. Responder applications that receive the DPI work package evaluate the DPI work package and send work package responses. At least one responder application includes in at least one work package response at least one responder feedback flag. The DPI service evaluates the DPI work package responses including the evaluation of at least one responder feedback flag using the custom logic provided by the customer. The DPI service sends a response to the DPI protocol request that includes an overall status of DPI processing of the DPI protocol request.

20 Claims, 19 Drawing Sheets

(56) References Cited

U.S. PATENT DOCUMENTS

| | | |
|---|---|---|
| 9,600,831 B1 | 3/2017 | Chou et al. |
| 9,703,813 B2 | 7/2017 | Hegde et al. |
| 9,904,796 B2 | 2/2018 | Pluder et al. |
| 9,996,592 B2 | 6/2018 | Hengstler et al. |
| 10,409,790 B2 | 9/2019 | Lehnert et al. |
| 10,430,413 B2 | 10/2019 | Christoph et al. |
| 10,552,642 B2 | 2/2020 | Rolle et al. |
| 10,642,805 B1 | 5/2020 | Masse |
| 10,740,487 B2 | 8/2020 | Barday et al. |
| 10,754,932 B2 | 8/2020 | Wiederspohn et al. |
| 10,776,254 B1 | 9/2020 | Dhayanithi |
| 10,839,099 B2 | 11/2020 | Vogel et al. |
| 10,909,222 B1 | 2/2021 | Fregly et al. |
| 11,042,654 B2 | 6/2021 | Nos et al. |
| 11,113,417 B2 | 9/2021 | Rolle |
| 11,494,546 B2 | 11/2022 | Rolle |
| 11,514,065 B2 | 11/2022 | Rolle |
| 11,550,781 B2 | 1/2023 | Rolle et al. |
| 11,714,828 B2 | 8/2023 | Rolle et al. |
| 2007/0089117 A1 | 4/2007 | Samson |
| 2008/0060051 A1 | 3/2008 | Lim |
| 2008/0174425 A1 | 7/2008 | Torning |
| 2009/0210394 A1 | 8/2009 | Saravanan et al. |
| 2009/0228340 A1 | 9/2009 | Bohannon |
| 2009/0254511 A1* | 10/2009 | Yeap .................. G06F 16/219 715/764 |
| 2012/0036507 A1 | 2/2012 | Jonnala et al. |
| 2013/0347064 A1 | 12/2013 | Aissi |
| 2014/0032600 A1 | 1/2014 | Sarferaz et al. |
| 2014/0059458 A1 | 2/2014 | Levien et al. |
| 2014/0082753 A1 | 3/2014 | Sarferaz |
| 2014/0109238 A1 | 4/2014 | Ravindran |
| 2014/0188572 A1 | 7/2014 | Hegde et al. |
| 2014/0267770 A1 | 9/2014 | Gervautz et al. |
| 2015/0242531 A1 | 8/2015 | Rodniansky |
| 2017/0006135 A1 | 1/2017 | Siebel et al. |
| 2017/0091479 A1 | 3/2017 | Pluder et al. |
| 2018/0101164 A1 | 4/2018 | Noetzelmann et al. |
| 2018/0189485 A1 | 7/2018 | Jain et al. |
| 2018/0322279 A1 | 11/2018 | Beskorovajnov et al. |
| 2019/0018985 A1 | 1/2019 | Rolle et al. |
| 2019/0236294 A1 | 8/2019 | McDonald et al. |
| 2019/0236334 A1 | 8/2019 | Babushkin |
| 2020/0019728 A1 | 1/2020 | Rolle |
| 2020/0184087 A1 | 6/2020 | Nos et al. |
| 2020/0285766 A1 | 9/2020 | Jois et al. |
| 2021/0089678 A1 | 3/2021 | Gkoulalas-Divanis et al. |
| 2021/0192052 A1 | 6/2021 | Loch et al. |
| 2021/0209251 A1 | 7/2021 | Parthasarathy |
| 2022/0043917 A1 | 2/2022 | Rolle |
| 2022/0050834 A1 | 2/2022 | Rolle et al. |
| 2022/0050920 A1 | 2/2022 | Rolle |
| 2022/0058333 A1 | 2/2022 | Rolle |
| 2022/0100755 A1 | 3/2022 | Rolle |
| 2022/0207429 A1 | 6/2022 | Haribhakti et al. |
| 2022/0277023 A1 | 9/2022 | Rolle et al. |
| 2022/0300837 A1 | 9/2022 | Shmelkin et al. |
| 2022/0309052 A1 | 9/2022 | Rolle |
| 2023/0081785 A1 | 3/2023 | Zhang |
| 2023/0176894 A1 | 6/2023 | Rolle et al. |
| 2023/0177180 A1 | 6/2023 | Rolle |
| 2023/0177182 A1 | 6/2023 | Rolle et al. |
| 2023/0177183 A1 | 6/2023 | Rolle et al. |
| 2023/0177186 A1 | 6/2023 | Ighoroje et al. |
| 2023/0177187 A1 | 6/2023 | Vogel et al. |
| 2023/0177188 A1 | 6/2023 | Vogel et al. |
| 2023/0177189 A1 | 6/2023 | Ighoroje et al. |
| 2023/0177194 A1 | 6/2023 | Rolle et al. |
| 2023/0177206 A1 | 6/2023 | Rolle et al. |
| 2023/0177213 A1 | 6/2023 | Rolle et al. |
| 2023/0179602 A1 | 6/2023 | Rolle et al. |
| 2023/0185938 A1 | 6/2023 | Schmidt et al. |
| 2023/0244637 A1 | 8/2023 | Wu |
| 2023/0385449 A1 | 11/2023 | Pluder et al. |

FOREIGN PATENT DOCUMENTS

| | | |
|---|---|---|
| CN | 114092253 | 2/2022 |
| CN | 115809259 | 3/2023 |

OTHER PUBLICATIONS

U.S. Appl. No. 17/457,797, filed Dec. 6, 2021, Ighoroje et al.
U.S. Appl. No. 17/457,802, filed Dec. 6, 2021, Rolle et al.
U.S. Appl. No. 17/457,811, filed Dec. 6, 2021, Rolle et al.
U.S. Appl. No. 17/457,816, filed Dec. 6, 2021, Vogel et al.
U.S. Appl. No. 17/457,824, filed Dec. 6, 2021, Vogel et al.
U.S. Appl. No. 17/457,827, filed Dec. 6, 2021, Ighoroje et al.
U.S. Appl. No. 17/680,717, filed Feb. 25, 2022, Rolle et al.
U.S. Appl. No. 17/680,741, filed Feb. 25, 2022, Rolle et al.
U.S. Appl. No. 17/680,759, filed Feb. 25, 2022, Rolle et al.
U.S. Appl. No. 17/680,858, filed Feb. 25, 2022, Rolle.
U.S. Appl. No. 17/702,013, filed Mar. 23, 2022, Rolle.
U.S. Appl. No. 17/718,770, filed Apr. 12, 2022, Rolle.
U.S. Appl. No. 18/049,063, filed Oct. 24, 2022, Hesse et al.
U.S. Appl. No. 18/073,142, filed Dec. 1, 2022, Rolle.
U.S. Appl. No. 18/073,164, filed Dec. 1, 2022, Rolle et al.
U.S. Appl. No. 18/074,745, filed Dec. 5, 2022, Vogel et al.
U.S. Appl. No. 18/077,476, filed Dec. 8, 2022, Rolle et al.
U.S. Appl. No. 18/077,493, filed Dec. 8, 2022, Rolle et al.
U.S. Appl. No. 18/347,029, filed Jul. 5, 2023, Rolle et al.
U.S. Appl. No. 18/347,065, filed Jul. 5, 2023, Hesse et al.
U.S. Appl. No. 18/487,283, filed Oct. 16, 2023, Vogel et al.
U.S. Appl. No. 18/487,293, filed Oct. 16, 2023, Rolle et al.
U.S. Appl. No. 18/487,347, filed Oct. 16, 2023, Rolle et al.
U.S. Appl. No. 18/487,365, filed Oct. 16, 2023, Rolle et al.
U.S. Appl. No. 18/487,484, filed Oct. 16, 2023, Rolle et al.
U.S. Appl. No. 18/629,084, filed Apr. 8, 2024, Rolle et al.
U.S. Appl. No. 18/629,091, filed Apr. 8, 2024 Rolle et al.
Help.sap.com [online], "End of Purpose (EoP) Check" Nov. 2020, [retrieved on Nov. 12, 2020], retrieved from: URL <https://help.sap.com/viewer/05a5505cc81943fb9d01e84cb2e135ef/750%20SP09/en-US/32b45853b2dc7425e10000000a44176d.html>, 3 pages.
Help.sap.com [online], "Master Data Integration" Nov. 2020, [retrieved on Mar. 16, 2021], retrieved from: URL <https://help.sap.com/viewer/99218f2c48044ddc8f2ea30adc0e38a1/7.1.21/en-US/46b8065a4df01517e10000000a114a6b.html?q=master%20data%20integration>, 2 pages.
Help.sap.com [online], "Processing Purposes" Jul. 2023, retrieved on Jul. 5, 2023, retrieved from URL <https://help.sap.com/docs/customer-data-platform/user-guide/processing-purposes?q=puposes.>, 9 pages.
Help.sap.com [online], "SAP Information Lifecycle Management" Nov. 2020, [retrieved on Mar. 16, 2021], retrieved from: URL <https://help.sap.com/doc/PRODUCTION/c3b6eda797634474b7a3aac5a48e84d5/1610%20002/en-US/frameset.htm>, 4 pages.
Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.
SAP "SAP Asset Manager Security Guide" Dec. 10, 2020, 28 pages.
SAP "SAP Event Stream Processor: Security Guide" Sep. 23, 2019, 58 pages.
Sap.com [online], "What is Gigya?" Aug. 2022, retrieved on Jul. 5, 2023, retrieved from URL <https://www.sap.com/products/acquired-brands/what-is-gigya.html?url_id=text-de-404-reclink>, 5 pages.
Wikipedia.org [online], "General Data Protection Regulation" Jan. 2013, [retrieved on Mar. 16, 2021], retrieved from: URL <https://en.wikipedia.org/wiki/General_Data_Protection_Regulation>, 16 pages.
Wikipedia.org [online], "Hyperscale computing" created on May 2013, retrieved on Dec. 1, 2022, retrieved from URL <https://en.wikipedia.org/wiki/Hyperscale_computing>, 2 pages.
Wikipedia.org [online], "Information privacy" created on May 2003, retrieved on Dec. 6, 2021, retrieved from URL <https://en.wikipedia.org/wiki/Information_privacy>, 7 pages.

(56) References Cited

OTHER PUBLICATIONS

Wikipedia.org [online], "Master Data" created on Oct. 2006, retrieved on Dec. 6, 2021, retrieved from URL <https://en.wikipedia.org/wiki/Master_data>, 2 pages.

Wikipedia.org [online], "Personal Data" created on May 2005, retrieved on Dec. 6, 2021, retrieved from URL <https://en.wikipedia.org/wiki/Personal_data>, 7 pages.

Wikipedia.org [online], "Personal Identifier" created on Feb. 2007, retrieved on Dec. 1, 2022, retrieved from URL <https://en.wikipedia.org/wiki/Personal_dentifier>, 3 pages.

* cited by examiner

| Requesting Ground | Description |
|---|---|
| art15gdpr 202 | Indicates that the responder should include such information typically required to fulfill an access request under article 15 of the GDPR |
| art20gdpr 204 | Indicates that the responder should only include such information that is subject to the right to data portability under article 20 of the GDPR |
| rtkccpa 206 | Indicates that the responder should include such information that is subject to the "right to know" under the Californian privacy law |
| intRec 208 | Indicates that the responder should additionally include internal recipients of the concerned personal data, such as users of the system who have accessed the data |
| extRec 210 | Indicates that the responder should additionally include external recipients of the concerned personal data, such as external data controllers or processors |
| art15anything 212 | Composite flag that can be translated to art15gdpr + intRec + extRec |

FIG. 2 200

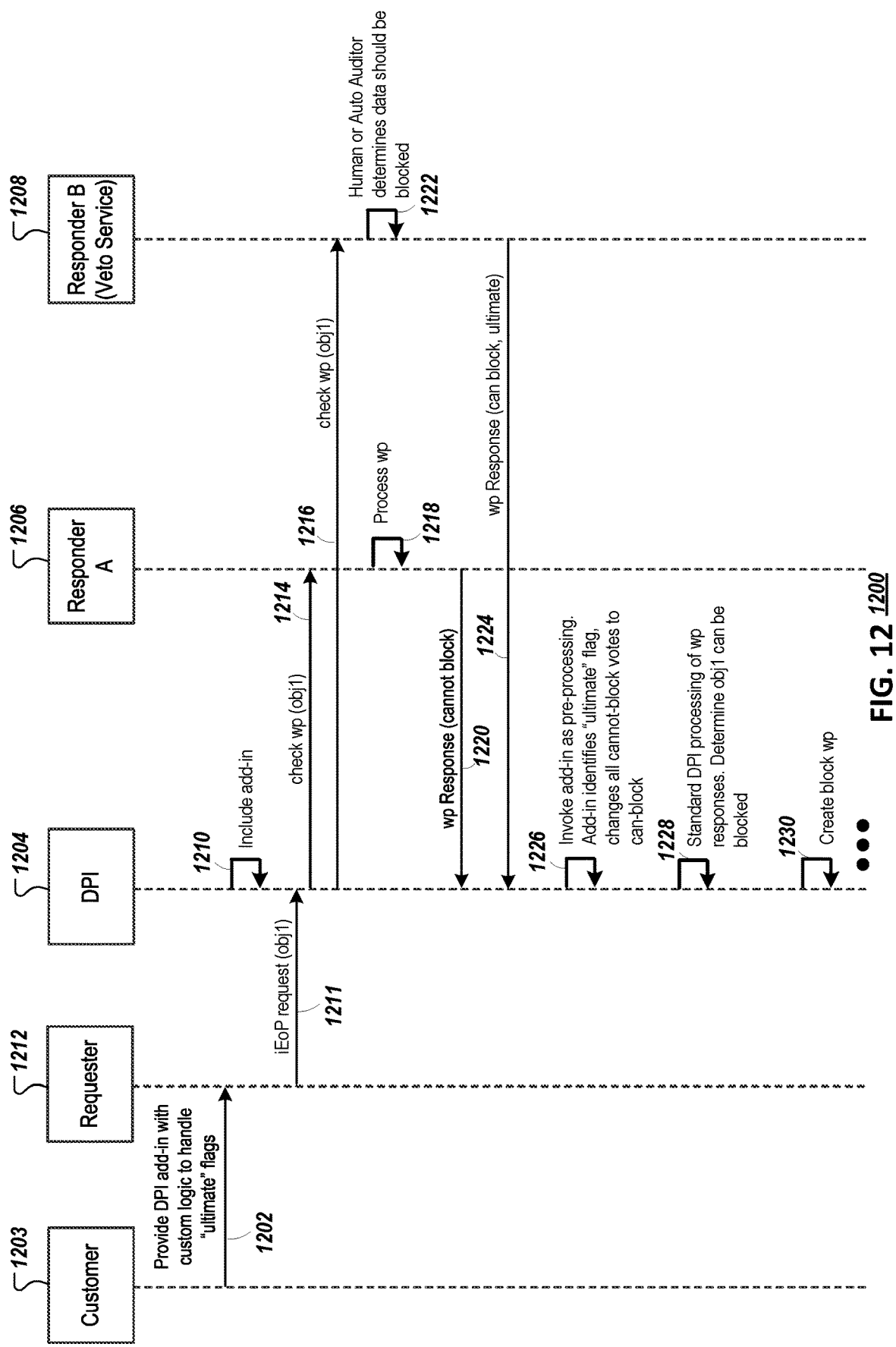

ENABLING CUSTOMIZATIONS TO A DATA PRIVACY INTEGRATION SERVICE

TECHNICAL FIELD

The present disclosure relates to computer-implemented methods, software, and systems for custom processing in data privacy integration (DPI) protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for custom processing in data privacy integration protocols. An example method includes: receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications; customizing the DPI service for the customer using the custom logic received from the customer; receiving, at the DPI service, a DPI protocol request for the customer; generating, by the DPI service and in response to the DPI protocol request, a DPI protocol work package; sending, by the DPI service, the DPI protocol work package to at least one responder application; receiving, by at least one responder application and from the DPI service, the DPI protocol work package; processing, by each responder application that receives the DPI work package, the DPI work package; sending, by the responder applications that received the DPI work package, DPI work package responses, wherein at least one responder application includes in at least one work package response at least one responder feedback flag; evaluating, by the DPI service, the DPI work package responses, wherein the evaluating of the DPI work package responses includes evaluating at least one responder feedback flag using the custom logic provided by the customer; and sending, by the DPI service, a response to the DPI protocol request that includes an overall status of DPI processing of the DPI protocol request.

Implementations can include one or more of the following features. Customizing the DPI service for the customer can include configuring an add-in to the DPI service for the customer using the custom logic received from the customer. The DPI protocol request can be an integrated end of purpose request for determining whether a consensus exists in the multiple-application landscape regarding whether at least one object can be blocked. The DPI work package can be a check work package that requests a responder application that receives the check work package to locally check whether objects in the DPI work package can be blocked by the responder application. The evaluating by the DPI service of a first responder feedback flag using the custom logic provided by the customer of the DPI service can include one of a) pre-processing before the DPI service performs standard DPI processing of the DPI work package responses; b) post-processing after the DPI service performs the standard DPI processing; c) replacement processing performed instead of the standard DPI processing; or d) pre-processing before the standard DPI processing and post-processing after the standard DPI processing, wherein the standard DPI processing comprises processing configured for multiple customers of the DPI service and the custom logic comprises processing specific to the customer. The standard DPI processing can include determining an overall consensus vote for an object of can-block in response to determining that each responder application can block the object and an overall consensus vote for the object of cannot-block if at least one responder application cannot block the object. The DPI service can identify, while evaluating the at least one responder feedback flag, a scenario in which a first set of responder applications can block an object despite not all responders having indicated an ability to block the object. The DPI service can send a block command to the first set of responder applications in response to identifying the scenario in which the first set of responder applications can block the object despite not all responders having indicated an ability to block the object. The DPI service can execute the custom logic as pre-processing and modify at least one DPI work package response for at least one responder application based on evaluating at least one responder feedback flag. As an example, a first responder feedback flag provided by a first responder application can inform the DPI service that objects in the DPI work package are to be blocked regardless of votes received by the DPI service from other responder applications. The DPI service can identify the first responder feedback flag from the first responder application that indicates that objects in the DPI work package are to be blocked regardless of votes received by the DPI service from other responder applications. The DPI service can change, in response to identifying the first responder feedback flag, any cannot-block votes in DPI work package responses to can-block votes. The DPI service can perform standard DPI processing of the DPI work package responses to determine a consensus can-block vote. As another example, a first responder application can be used by a human administrator and the first responder application can provide information from the DPI work package to the human administrator. The first responder application can receive an indication from the human administrator that objects in the DPI work package should be blocked regardless of votes provided by other responder applications. The first responder application can include the first responder feedback flag in a first DPI work package response that informs the DPI service that objects in the DPI work package should be blocked regardless of votes provided by other responder applications. A first responder feedback flag sent by a first responder application can provide information to the DPI service regarding why a first object cannot be blocked by the first responder application. The first responder feedback flag can inform the DPI service a type of data present in the first responder application that prevents the first responder application from being able to block the first object. At least one responder application can be customized to use custom logic received from the customer of the DPI service to evaluate at least one requesting ground value received from the DPI service in DPI protocol requests. The DPI service can send at least one requesting ground value in a DPI work package to responder applications. The responder applications can perform custom logic to evaluate the requesting ground value received from the DPI service. At least one responder application can send a responder feedback flag determined at least in part based on evaluation of a requesting ground value received from the DPI service and the DPI service can evaluate, using the custom logic provided by the customer, responder feedback flags determined by responders at least in part based on evaluation of a requesting ground value received by the DPI service. As another example, the DPI service can receive, in response to a first work package and from a first responder application, a vote of can-block for an object along with a responder feedback flag requesting that the object not be blocked in the first responder application despite the first responder application being able to block the object. The DPI service can evaluate, using standard DPI processing, responses to the first work package including the can-block vote received from the first responder application. The DPI service can determine, based on the evaluating of the responses to the first work package, that the object can be blocked in the multiple application landscape. The DPI service can evaluate, in post-processing that occurs after the standard DPI processing, the responder feedback flag from the first responder application, where the evaluating of the responder feedback flag results in the prevention of a block command being sent to the first responder application for the object.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 is a table that illustrates example requesting grounds.

FIGS. 10-12 are swim lane diagrams of example processes for customizations of DPI processing using responder feedback flags.

DETAILED DESCRIPTION

Figure 1:
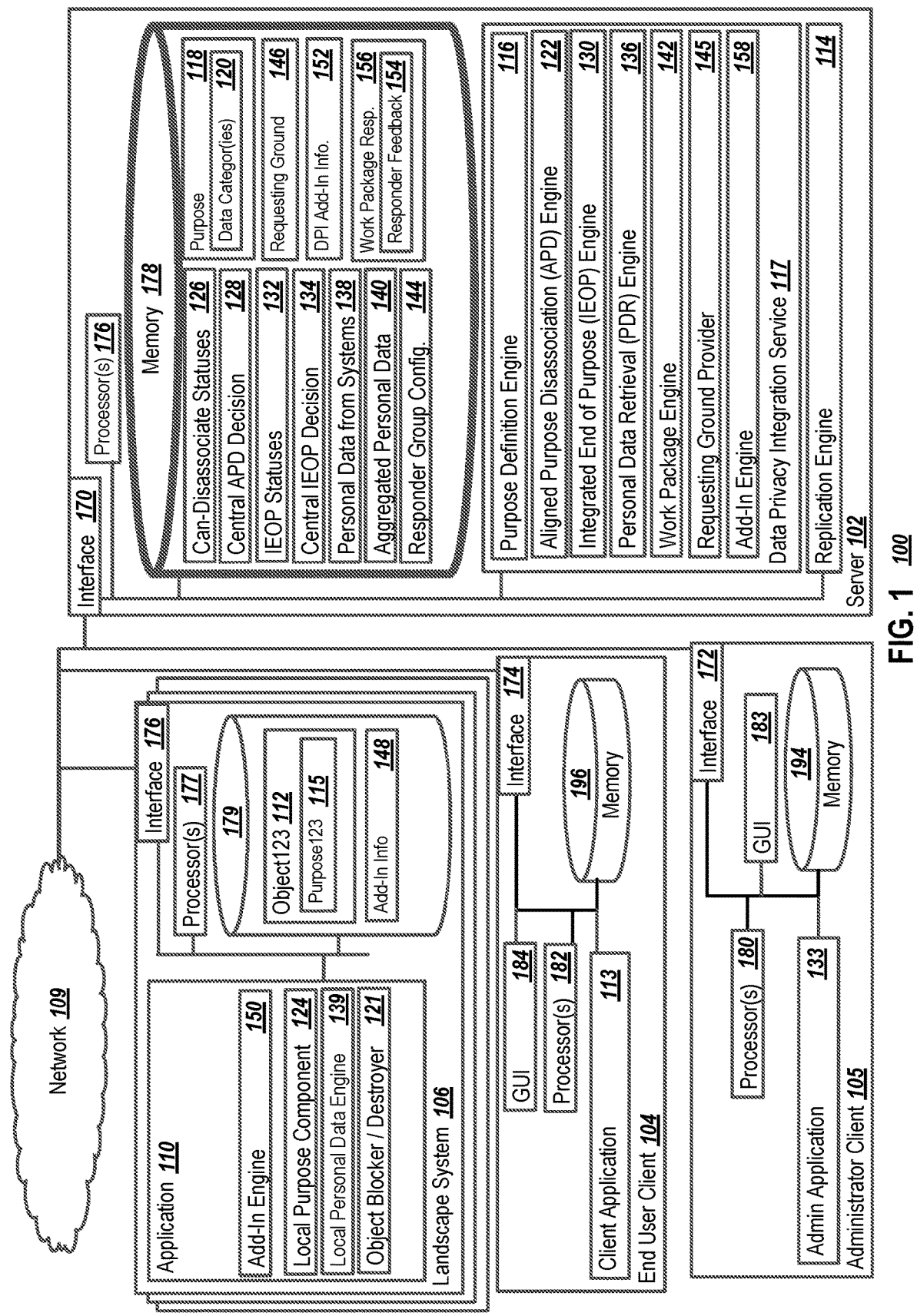
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block operation in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

A software system in which a data controller (e.g., a customer of the software system) models purposes for which personal data is processed can link custom-defined purposes with processing actions that are performed for these purposes, so that the processing of personal data within the software system is purpose-based. Additionally, data categories can be associated with purposes to define what personal data of which data categories can be used for different processing steps. Purpose-based processing is described in more detail in U.S. patent Ser. No. 18/347,029, filed Jul. 5, 2023, entitled "PURPOSE-BASED PROCESSING BY PURPOSE-ACTION ASSOCIATION,", the entire contents of which are hereby incorporated by reference.

Enterprise software (eg, cloud software or on-premise software) may be developed as standard software, meaning that during the development phase of the software, the software vendor may consider requirements that customers of the software typically have regarding using such software. Customer requirements may include data protection requirements, such as the capability to export personal data concerning a given data subject (e.g., to comply with legal requirements, such as article 15 or article 20 of the GDPR (General Data Protection Regulation), or other legal requirements).

Regarding GDPR, article 15 defines the right of access for data subjects. For example, article 15 grants data subjects a right to receive a confirmation whether a data controller processes personal data concerning the data subject. In addition, the data subject has a right to request additional meta-information about the processing, such as the purposes of the processing, the categories of processed personal data, and recipients to whom the personal data has been or will be disclosed. The data subject can additionally request a copy of personal data undergoing processing, which can be limited in that providing the copy must not adversely affect the rights and freedoms of others. For example, a company payroll system may store and process personal information for an employee for providing payroll to the employee. As an example, an employee may have wage garnishment performed for paying a portion of a salary to an ex-partner due to a judgement against the employee. The payroll system may store bank account information, address information, etc., of the ex-partner, for paying the ex-partner to satisfy the judgement. Article 15 can be interpreted such that a personal data request by the employee should not result in providing the personal information of the ex-partner to the employee, even though the system stores that information in association with the employee.

In contrast to article 15, article 20 of GDPR defines a right to data portability. Based on article 20, a data subject can request personal data in a common machine-readable format. The data subject can further request that the data controller transfers a copy of personal data to another data controller, when such interfaces exist. For example, a data subject can request that a first streaming music provider exports a playlist of the data subject to a second streaming music provider. However, in comparison to article 15, the scope of personal data subject to article 20 is narrower, in that article 20 related personal data includes only such data (1) that was provided by the data subject (e.g., not obtained from other sources and not derived from other data); and (2) where the processing is based on consent or a contract and carried out by automated means. Automated means are typically the case for software applications.

Different challenges can arise with regards to particular software customers being in compliance with GDPR and/or other regulations. For example, regulations can and often do change over time, based on legal proceedings. For example, a European Court of Justice ruling (e.g., for case C-579/21) stated that per article 15 of the GDPR an employee has a right to know which particular other employees accessed their personal data. Prior to that ruling, previous interpretations of article 15 may have deemed such information not required to be exported by data controllers during personal data exports.

As another example, different software customers may reside in or be subject to different jurisdictions that have different regulations. Furthermore, different software customers may have different strategic and/or legal interpretations of compliance or compliance approaches for certain or different regulations. Additionally, with respect to data privacy integration scenarios, a customer may use multiple different applications in their software landscape and alignment of application responses and participation in DPI scenarios should be implemented. However, software applications that are part of a software landscape with several other software applications are generally not trivial to extend in a foreseen way since an extension/modification mechanism should be aligned between applications that are extended or modified as part of a same overall process. While some DPI related processing can be implemented in a central DPI service and in respective portions of applications that may interface with the DPI service, the software provider of DPI and participating applications generally cannot foresee exact details of how each software customer may wish to customize processing with respect to data privacy compliance.

As an example, a streaming music service provider may use different software products of a software vendor. The streaming music provider may serve users in different jurisdictions, such as the European Union and California in the United States, meaning the software comprising the streaming music provider's product may need to comply with different regulations, such as the GDPR and California privacy law. Additionally, the streaming music provider may wish to respond differently to specific types of requests. For example, the streaming music provider may determine that to comply with article 15, that personal data such as a list of songs added by a user to a library, observed usage characteristics, songs added to custom playlists, and derived playlists derived from user input or behavior (e.g., a "your favorite music" playlist) may be exported to a user in response to a right of access request. However, the streaming music provider may determine that to comply with article 20 of the GDPR, the derived playlists do not need to (and therefore will not be) exported. However, if the streaming music service only receives an "export personal data" request, the streaming music service may not know under which requesting grounds (e.g., article 15, article 20, a California law provision) the request is being made.

Accordingly, a data controller may, for a variety of reasons, want to tailor responses to DPI requests or DPI processing in general. A DPI service could include an option to allow a compliance officer to manually adjust, for example, a personal data export according to specific customer requirements, but that might not lead to an acceptable or workable solution. For example, such a manual approach would generally be resource-intensive and error-prone.

Alternatively, automated enhancements to DPI frameworks can be implemented to solve the above challenges and support individual customer requirements of data controllers in an efficient and consistent manner, as described in detail below. Automated DPI enhancements can enable different customers to have the option to individually decide and implement how respective data privacy requirements are fulfilled. The solution described herein can enable a customer to comply with exporting personal data from a distributed software system or responding to other DPI requests by configuring different implementations for different jurisdictions. Additionally, the solution can enable customers to make changes to their environments to adapt to changing requirements such as case law in their own jurisdictions without waiting for or relying on a possible inclusion of such functionality in a standard software release. In general, software customers can create implementations that match their specific legal interpretations and assessment of legal risks in conjunction with their strategic decisions. Various specific examples are provided below, in a context of iPDR, iEoP, and other DPI protocols.

For example, the software provider or vendor may enable customizations (e.g., add-ins) to applications that participate in DPI protocols, to enable customers to implement custom processing. For example, custom logic can be implemented that enables custom application processing in response to different requesting ground indicators that are sent by the DPI service. As another example, the software provider of the DPI service can enable customizations to the DPI service, to enable custom responding by the DPI service to responder feedback provided by applications responding to DPI requests. A given customer can choose to customize applications, the DPI service itself, or both applications and the DPI service.

The solution described herein can provide various advantages. For instance, the solution described herein enable data controllers to individually adjust DPI protocols to their specific needs. The solution enables data controllers to tailor data privacy integration protocols according to their specific processes and landscape setup, without the necessity of changing a standard implementation. Furthermore, the solution enables data controllers to adjust processing close to a context of data processing (e.g., within data exporting or processing systems), depending on a respective jurisdiction, interpretation of the law, strategic considerations, current case law, etc. For example, context of data may be known within a particular application but that context may be lost once data is exported. Accordingly, enabling customers to customize processing in places where most meaningful context exists can result in more compliant handling of data.

Additionally, manual effort may be reduced by enabling custom automated solutions (as compared to manual effort that may be required in specific situations for certain customers). Additionally, reducing manual interactions from processes such as exporting personal data may further lead to an improved sense of privacy by concerned data subjects.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

A purpose 118 can be associated with data categories 120. An administrator can assign one or more data categories 120 to a purpose 118 to specify which of potentially different attribute sets stored for a data object can be used when data for the purpose 118 is processed.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End-of-Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144. For example, within the iPDR protocol, the DPI service 117 can communicate with landscape systems 106 using work packages that can request that a specific activity should be performed. For example, an iPDR work package can communicate that a receiving system should export personal data stored in association with a certain object that represents a data subject. Work packages can also be used in other data privacy protocols, such as in iEoP and APD protocols. For those protocols, work packages can indicate a request to perform a local end-of-purpose check, to block, to unblock, or to redistribute specific personal data. A landscape system 106 generally responds to the work package by providing a status of performing the action indicated in the work package.

To enable custom responses by landscape systems, a requesting ground provider 145 of the DPI service 117 can include requesting ground values 146 in work packages sent from the DPI service 117. A customer that uses a landscape system 106 can provide add-in information 148 to the landscape system 106 that includes, for example, custom logic representing custom processing to be performed in response to receiving certain requesting ground values from the DPI service 117. An add-in engine 150 can configure the landscape system 106 to enable, for the customer, the custom logic in the add-in information 148. With respect to the iPDR protocol, requesting grounds can enable customers ability to decide, for example, whether to remove personal data from an export, add further personal data to an export, modify personal data that is part of an export, or add meta information to an export. Several additional examples are described below with respect to subsequent figures.

Additionally and as mentioned, a customer can also be enabled to customize the DPI service 117. For example, the customer can provide DPI add-in information 152 that includes custom logic for evaluating and handling responder feedback flags 154 that may be included in work package responses 156 received from landscape systems 106 that respond to DPI work package requests. A DPI add-in engine 158 can configure the DPI service 117 to enable the custom logic for the customer. Responder feedback flags 154 may be, for example, a field on a response level or on an object instance identifier level to indicate whether the responder feedback information is of a general nature (e.g., applicable to all objects in the work package), or of an object specific nature. The custom logic enabled for the customer can be performed by the DPI service 117 prior to, after, or in place of standard DPI logic for the evaluation of work package responses. Responder feedback flags can enable the customer to change input values given by landscape systems 106 for work package response evaluation and therefore enabling customizing an outcome of the standard DPI implementation. Using a responder feedback flag approach, the customer can overwrite the standard behavior of the DPI service 117 when evaluating work package feedback.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

FIG. 2 is a table 200 that illustrates example requesting grounds. An "art15gdpr" requesting ground 202 indicates that the responder should include such information typically required to fulfill an access request under article 15 of the GDPR. An "art20gdpr" requesting ground 204 indicates that the responder should only include such information that is subject to the right to data portability under article 20 of the GDPR. A customer may implement, for example, in an add-in, in response to receiving the art20gdpr requesting ground 204, functionality to remove from a response to an iPDR work package data that is not considered subject to article 20. A "rtkccpa" requesting ground 206 indicates that the responder should include such information that is subject to the "right to know" under the Californian privacy law.

An "intRec" requesting ground 208 indicates that the responder should additionally include internal recipients of the concerned personal data, such as users of the system who have accessed the data. A customer may implement, for example, in an add-in, in response to receiving the intRec requesting ground 208, functionality to evaluate log files to identify information about system users who have accessed personal data that is included in an iPDR response. An "extRec" requesting ground 210 indicates that the responder should additionally include external recipients of the concerned personal data, such as external data controllers or processors. An "art15anything" requesting ground is a composite requesting ground (e.g., composite flag) that can be resolved to a collection of atomic requesting grounds that are applicable for article 15 (e.g., art15gdpr+intRec+extRec). Other requesting ground examples are described below.

Figure 3:
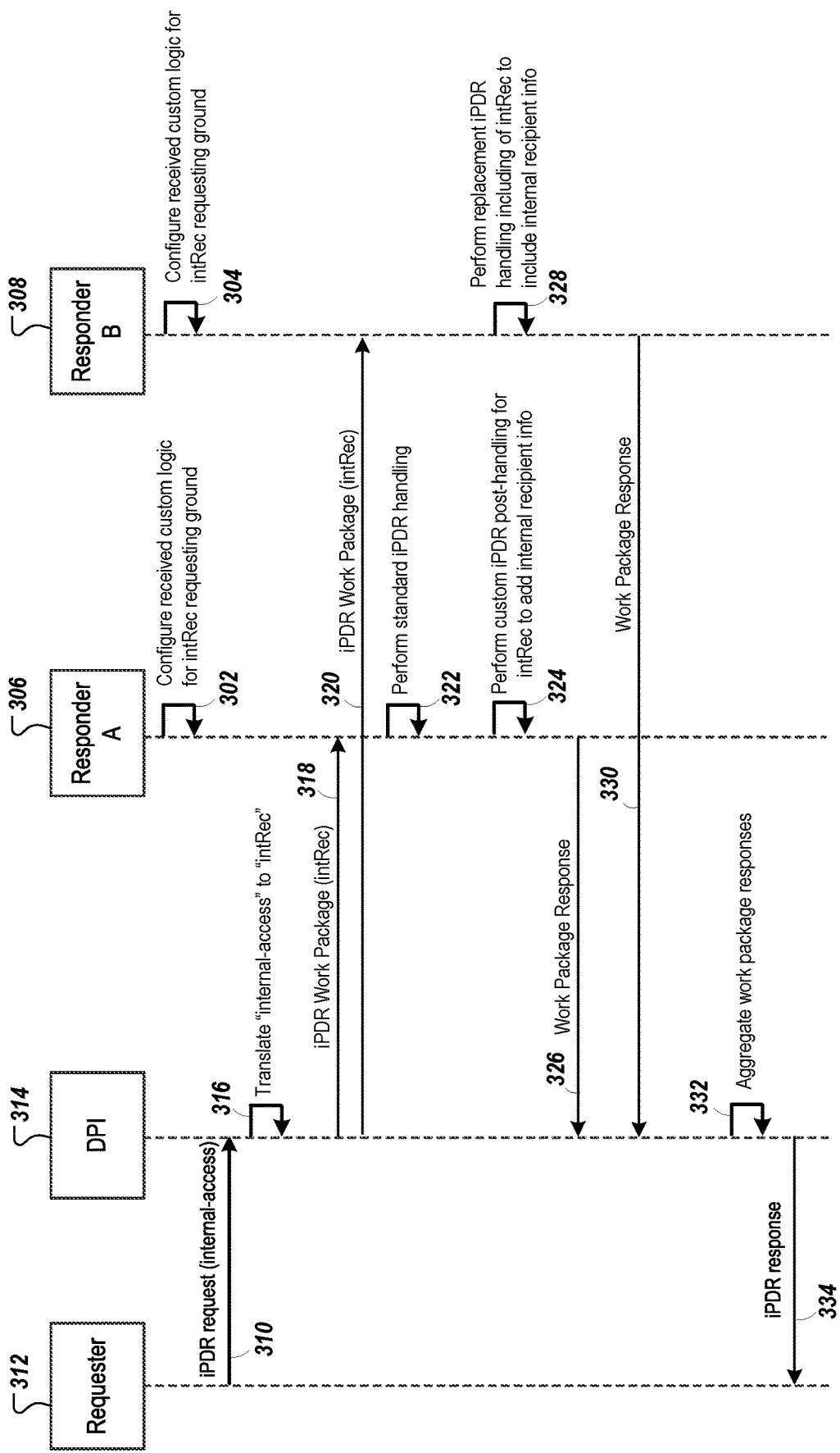
FIGS. 3-9 are swim lane diagrams of example processes for customizations of DPI processing using requesting grounds.

FIG. 3 is a swim lane diagram of an example process 300 for customizations of DPI processing using requesting grounds. At 302 and 304, respectively, responder applications 306 and 308 (e.g., "responder A" and responder "B") receive custom logic for handling requesting ground indicators, including logic to handle an "intRec" requesting ground (e.g., the intRec requesting ground 208 described above with respect to FIG. 2). The responders 302 and 304 can configure the received logic as add-ins to respective applications, for example.

At 310, a requester 312 sends an iPDR request to a DPI service 314. The iPDR request can include, reference, or be associated with a requesting ground of "internal-access". For example, the requester 312 may include the internal-access requesting ground to indicate a request of inclusion of information about recipients of personal data who are internal to a data controller organization. The internal-access requesting ground can be provided to the DPI service 314 in various ways. In some implementations, requesting grounds can be included in an API (Application Programming Interface) call to the DPI service 314 as a parameter (e.g., a parameter on a URL (Uniform Resource Locator)), along with other parameters.

At 316, the DPI service 314 translates the received "internal-access" requesting ground to a synonymous "intRec" requesting ground. The DPI service 314 may maintain groups of synonymous requesting grounds, for example. The DPI service 314 may determine which responders are to receive which synonymous requesting ground. In this example, the DPI service 314 may have information that the responders 302 and 304 each support the intRec requesting ground (but not a synonymous internal-access requesting ground). As another example, the DPI service may determine that "art15", "art15gdpr", and "ART15GDPR" are synonymous requesting grounds and may send a particular respective requesting ground from that group to particular responders, based on configuration information. Different synonymous requesting grounds may be used if some systems do not support certain characters (e.g., upper or lower case characters, German umlauts, etc.). In summary, the DPI service 314 can provide a synonymous requesting ground to a given responder that the given responder understands.

At 318 and 320, the DPI service 314 sends, to the responder 306 or the responder 308, respectively, an iPDR work package that includes the intRec requesting ground. The responder 306 may have configured received custom logic for handling the intRec requesting ground as a post-processing option that is invoked after standard iPDR processing has been performed by the responder 306. In general, custom processing can be configured as pre-processing, post-processing, or replacement processing, in relation to standard processing. In this example, at 322, the responder 306 first performs standard iPDR processing of the work package to identify relevant personal data. At 324, the responder 306 invokes the custom logic, as a post-processing step, to handle the intRec requesting ground. For instance, the responder 306 can perform processing to determine internal recipients of the personal data identified in the standard iPDR processing. For example, the responder 306 can access and evaluate log files of the responder 306 to determine information about system users who have accessed the personal data identified in the standard iPDR processing. At 326, the responder 306 sends a work package response to the DPI service 314 that includes the retrieved personal data as well as the determined internal recipient information.

As another example, the responder 308 may have configured received custom logic for handling the intRec requesting ground as a replacement for the standard iPDR processing. For example, the custom logic received at the responder 308 can be configured to determine personal recipient information for personal data while the personal data is being retrieved. Accordingly, at 328, the responder 308 performs the replacement iPDR processing that retrieves both personal information and internal recipient information. At 330, the responder 308 sends a work package response to the DPI service 314 that includes the retrieved personal data as well as the determined internal recipient information.

At 332, the DPI service 314 aggregates information received from all responders (e.g., including information received from the responder 306 and the responder 308). At 334, the DPI service 314 sends an iPDR response to the requester 312, in response to the received iPDR request.

Figure 4:
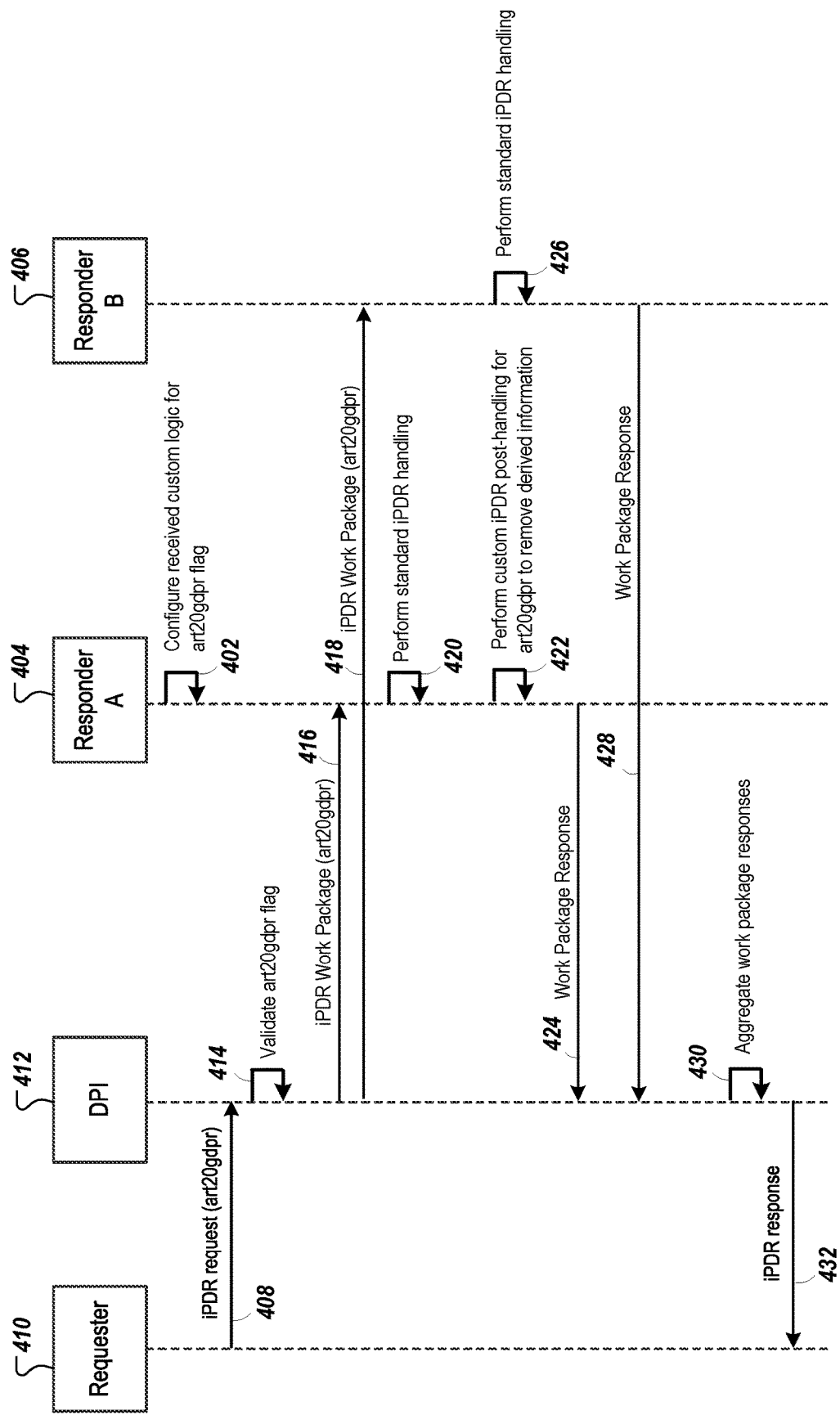

FIG. 4 is a swim lane diagram of an example process 400 for customizations of DPI processing using requesting grounds. At 402, a responder 404 receives custom logic for handling requesting ground indicators, including logic to handle an "art20gdpr" requesting ground (e.g., the art20gdpr requesting ground 204 described above with respect to FIG. 2). The responder 404 can configure the received logic as an add-in to the responder 404, for example. A responder 406 does not receive any custom logic in this example. The responder 406 may not need any custom handling to satisfactorily handle article 20 requests per the data controller, for example. As another example, the responder 406 may be a legacy application that does not currently support requesting grounds or add-in capability, for instance.

At 408, a requester 410 sends an iPDR request to a DPI service 412. The iPDR request can include, reference, or be associated with a requesting ground of "art20gdpr".

At 414, the DPI service 412 validates the art20gdpr requesting ground. For example, the DPI service 412 can confirm that arg20gdpr is a recognized requesting ground. If the DPI service 412 does not recognize the art20gdpr requesting ground, the DPI service 412 can either 1) ignore the iPDR request; 2) respond to the requester 410 with an error message indicating that the art20gdpr requesting ground was not recognized; 3) continue to process the iPDR request but ignore the art20gdpr requesting ground; or 4) process the iPDR request but send a default requesting ground (e.g., "art15anything") to responders. Note: in some implementations or for some requests, a default requesting ground can also be sent to responders in cases where the request itself does not include a requesting ground.

As another example, the DPI service 412 can validate the art20gdpr requesting ground by determining whether the art20gdpr requesting ground has been received along with any other requesting grounds that are incompatible with the art20gdpr requesting ground. For example, the DPI service 412 can be configured to not allow a request that has both art20gdpr and art15gdpr requesting grounds. If a data subject wants to exercise rights under both article 15 and article 20, the DPI service 412 can require that different requests (e.g., with different requesting grounds) be submitted. If the DPI service 412 determines that incompatible requesting grounds are included in a request, the DPI service 412 can reject the request (or simply ignore requesting grounds or use one or more default requesting grounds, as described above).

Requesting ground compatibility rules can be configured by an administrator of the DPI service 412, for example. For instance, the administrator may define a rule indicating that "intRec" and "extRec" requesting grounds cannot be set if "art20gdpr" is set, since semantically, recipient information is not subject to article 20 of the GDPR. In some cases, the DPI service 412 can use another service to validate received requesting grounds.

At 416 and 418, the DPI service 412 sends, to the responder 404 or the responder 406, respectively, an iPDR work package that includes the art20gdpr requesting ground. The responder 404 may have configured received custom logic for handling the art20gdpr requesting ground as a post-processing option that is invoked after standard iPDR processing has been performed by the responder 404. Accordingly, at 420, the responder 404 first performs standard iPDR processing of the work package to identify relevant personal data. At 422, the responder 404 invokes the custom logic, as a post-processing step, to handle the art20gdpr requesting ground. For instance, the responder 404 can perform processing to remove derived information from information that was identified in step 420. For example, the responder 404 may be a music streaming service and the derived information may be a favorites playlist created automatically by the music streaming service using derived information derived from user interactions with the music streaming service. At 426, the responder 404 sends a work package response to the DPI service 412 that includes retrieved personal data after derived information has been removed.

At 426, the responder 406 performs standard iPDR processing of the work package to identify relevant personal data. As mentioned, in this example, the responder 406 has not been configured with any custom processing at least in regards to the art20gdpr requesting ground. In this example, the responder 406 can ignore the art20gdpr requesting ground. At 428, the responder 406 sends a work package response to the DPI service 412 that includes the retrieved personal data as well as the determined internal recipient information.

At 430, the DPI service 412 aggregates information received from all responders (e.g., including information received from the responder 404 and the responder 406). At 432, the DPI service 412 sends an iPDR response to the requester 410, in response to the received iPDR request.

Figure 5:
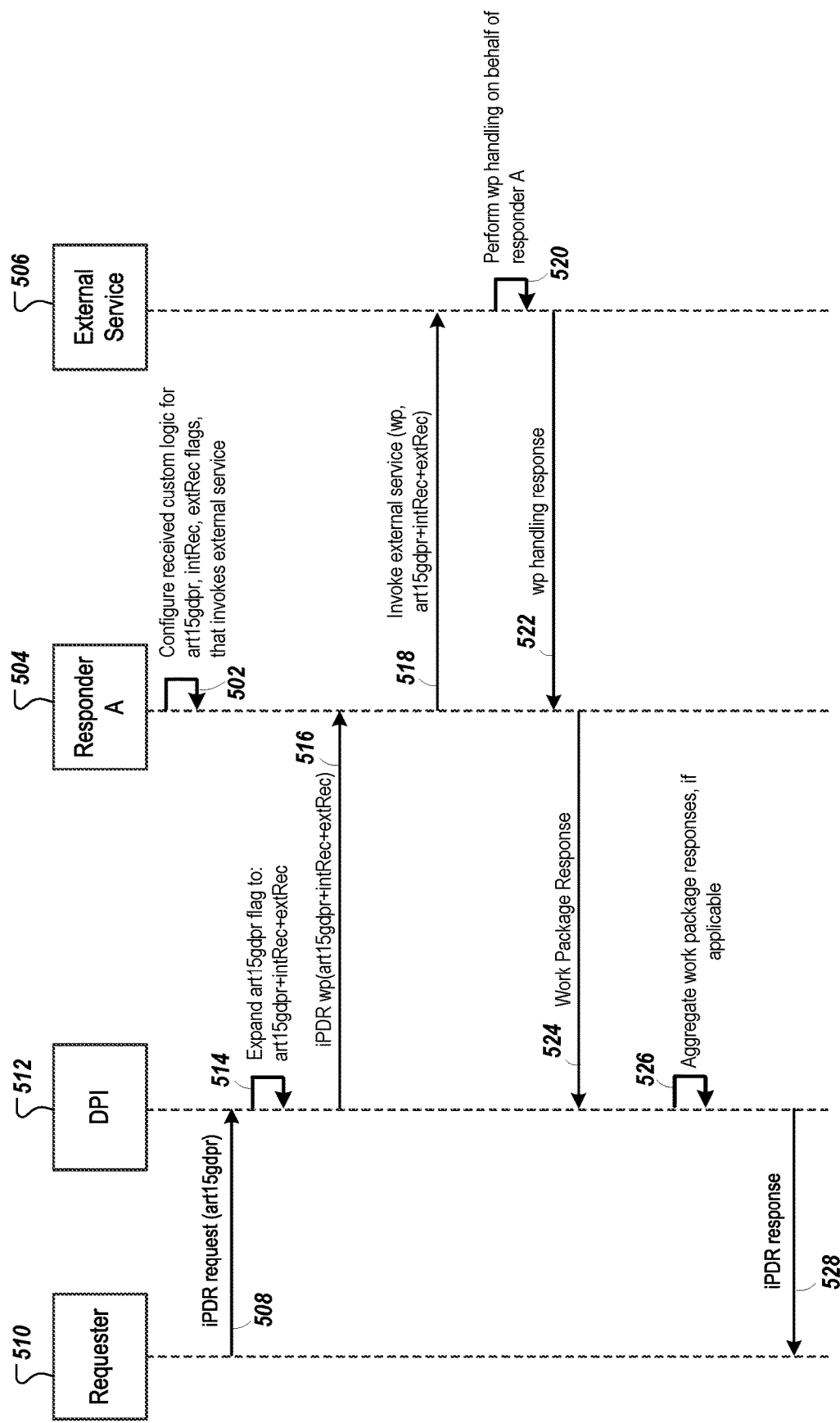

FIG. 5 is a swim lane diagram of an example process 500 for customizations of DPI processing using requesting grounds. At 502, a responder 504 receives custom logic for handling requesting ground indicators, including logic to handle "art15gdpr", "intRec", and "extRec" requesting grounds. The responder 504 can configure the received logic as an add-in to the responder 504, for example. The custom logic can include calls to an external service 506 (e.g., a service external to the responder 504).

At 508, a requester 510 sends an iPDR request to a DPI service 512. The iPDR request can include, reference, or be associated with a requesting ground of "art15gdpr".

At 514, the DPI service 512 expands the art15gdpr requesting ground into multiple requesting grounds. For example, the DPI service 512 can replace the single art15gdpr requesting ground with a set of requesting grounds including the original art15gdpr requesting ground and additional intRec and extRec requesting grounds. In general, the DPI service 512 can be configured to expand a given requesting ground into multiple respective atomic requesting grounds understandable by responders. In some cases, the originally-received requesting ground is itself not an atomic requesting ground but is replaced by at least one atomic requesting ground.

At 516, the DPI service 512 sends, to the responder 504, an iPDR work package that includes each of the art15gdpr, intRec, and extRec requesting grounds. The responder 504 may have configured the custom logic received at step 502 as replacement processing to replace standard iPDR processing. At 518, the responder 504 invokes the custom logic which can include invoking the external service 506 and providing the work package and the art15gdpr, intRec, and extRec requesting grounds to the external service 506. At 520, the external service processes the work package, including the handling of received requesting grounds, on behalf of the responder 504.

In some cases the external service 506 may be an automated service that includes custom logic. In other cases, the external service 506 is or includes a veto service that may utilize a human auditor. In some cases, the external service 506 handles some processing or requests automatically and other processing or requests by forwarding information to a human auditor. Although in this example, invocation of the external service 506 by the responder 504 is described as replacement processing, in some cases, a responder first performs standard processing and then invokes an external service, such as a veto service. For example, the external service 506 or another service can show responder-generated information for a request and relevant requesting grounds to a human auditor, for review and possible adjustment by the auditor.

At 522, the external service 506 sends a work package handling response to the responder 504. In this example, the work package handling response can include retrieved personal data and recipient information obtained by the external service 506. In other examples, the work package handling response can include adjustments to information previously generated by the responder.

At 524, the responder 504 sends a work package response to the DPI service 512 that includes information received from the external service 506. At 526, the DPI service 512 aggregates information received from all responders (e.g., including information received from the responder 504). At 528, the DPI service 512 sends an iPDR response to the requester 510, in response to the received iPDR request.

Figure 6:
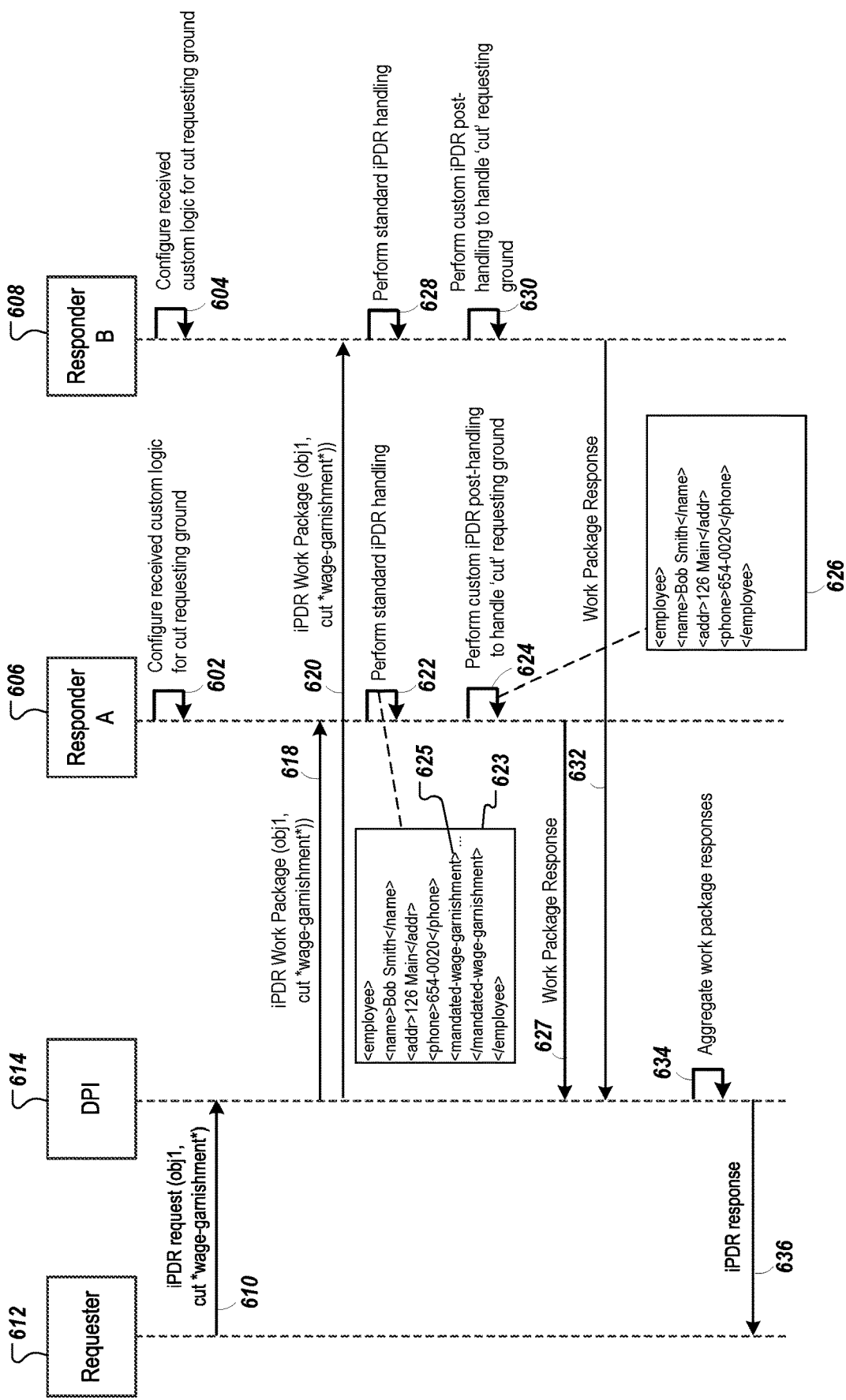

FIG. 6 is a swim lane diagram of an example process 600 for customizations of DPI processing using requesting grounds. At 602 and 604, respectively, responder applications 606 and 608 (e.g., "responder A" and responder "B") receive custom logic for handling requesting ground indicators, including logic to handle a "cut" requesting ground. The cut requesting ground is an example of a requesting ground that instructs a responder to cut (e.g., remove), from an iPDR response, a specified portion of retrieved personal data (e.g., where the specified portion is specified using a parameter to the requesting ground, as described below). The responders 602 and 604 can configure the received logic as add-ins to respective applications, for example.

At 610, a requester 612 sends an iPDR request to a DPI service 614. The iPDR request can include, reference, or be associated with a requesting ground of "cut*wage-garnishment*" that communicates to responders to remove from retrieved personal data any portion (e.g., node or element) of personal data that has an identifier or node/element name that matches a "*wage-garnishment*" wildcard pattern.

At 618 and 620, the DPI service 614 sends, to the responder 606 or the responder 608, respectively, an iPDR work package that includes the cut requesting ground and its associated wildcard pattern parameter. The responders 606 and 608 may have each configured received custom logic for handling the cut requesting ground as a post-processing option that is invoked after standard iPDR processing has been performed by the respective responder. Accordingly, at 622, the responder 606 first performs standard iPDR processing of the work package to identify relevant personal data. For example, relevant personal data 623 may be identified and gathered in an XML (extensible Markup Language) format, JSON (JavaScript Object Notation), or other type of format.

At 624, the responder 606 invokes the custom logic it received, as a post-processing step, to handle the cut requesting ground and its corresponding parameter. For instance, the responder 606 can perform processing to locate any elements of the relevant personal data 623 that match the wildcard pattern parameter of "*wage-garnishment*". For example, the responder 606 can identify and remove, from the relevant personal data 623, a "<mandated-wage-garnishment>" element 625, as illustrated by updated personal data 626 that no longer includes the element 625. At 627, the responder 606 sends a work package response to the DPI service 614 that includes the updated personal data.

The responder 608 can perform similar processing as the responder 606 in this example. For instance, at 628, the responder 608 first performs standard iPDR processing of the work package to identify relevant personal data. At 630, the responder 608 invokes the custom logic it received, as a post-processing step, to handle the cut requesting ground and its corresponding parameter, to remove any personal data items that match the parameter (if any). At 632, the responder 608 sends a work package response to the DPI service 614 that includes retrieved personal data that may have been modified (e.g., according to the received cut parameter) by custom logic.

At 634, the DPI service 614 aggregates information received from all responders (e.g., including information received from the responder 606 and the responder 608). At 636, the DPI service 614 sends an iPDR response to the requester 612, in response to the received iPDR request.

Figure 7:
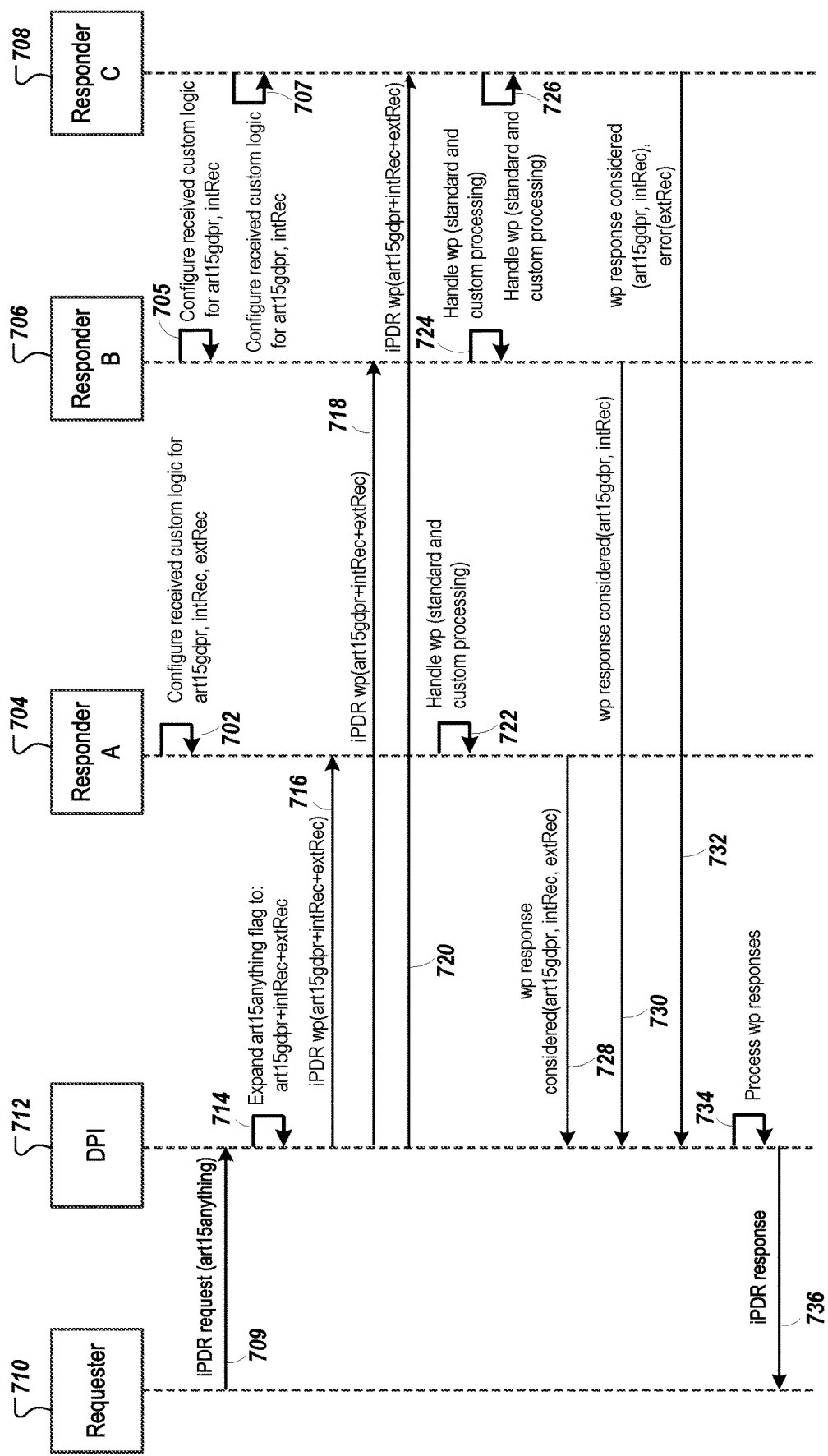

FIG. 7 is a swim lane diagram of an example process 700 for customizations of DPI processing using requesting grounds. At 702, a responder 704 receives custom logic for handling requesting ground indicators, including logic to handle "art15gdpr", "intRec", and "extRec" requesting grounds. The responder 704 can configure the received logic as an add-in to the responder 704, for example. At 705, a responder 706 receives custom logic for handling requesting grounds "art15gdpr" and "intRec" but not for handling requesting ground "extRec". Similarly, at 707, a responder 708 receives custom logic for handling requesting grounds "art15gdpr" and "intRec" but not for handling requesting ground "extRec". The customer may not have yet added custom logic for handling the extRec custom ground to the responders 706 and 708, for example, due to a delay in implementation, an inadvertent omission, faulty deployed logic, or some other reason.

At 709, a requester 710 sends an iPDR request to a DPI service 712. The iPDR request can include, reference, or be associated with a requesting ground of "art15ganything" (e.g., corresponding to the requesting ground 212 described above). At 714, the DPI service 712 expands the art15ganything requesting ground into multiple requesting grounds. For example, as described above for the process 500, the DPI service 712 can replace the single art15anything requesting ground with a set of requesting grounds including the art15gdpr, intRec, and extRec requesting grounds. Although illustrated as requesting ground expansion by the DPI service 712 in the example of FIG. 7, in general, a request from a requester can itself include multiple requesting grounds.

At 716, the DPI service 712 sends, to the responder 704, an iPDR work package that includes each of the art15gdpr, intRec, and extRec requesting grounds. Similarly, at 718 and 720, the DPI service 712 respectively sends, to the responders 706 and 708, an iPDR work package that includes each of the art15gdpr, intRec, and extRec requesting grounds. At 722, 724, and 726, each of the responders 704, 706, and 708 perform processing of the iPDR work package, respectively, for example using both standard processing and custom processing using custom logic received by each respective responder.

In general, responders can generate responses in different ways to work packages that include or are otherwise associated with requesting ground(s). For example, a responder can include, in a work package response, a list of considered requesting grounds. For instance, at 728, the responder 704 sends a work package response to the DPI service 712 that includes a list of considered requesting grounds (e.g., where the considered list includes art15pdgr, intRec, and extRec).

As another example, at 730, the responder 706 sends a work package response to the DPI service 712 that includes a list of considered requesting grounds that includes art15pdgr and intRec but not extRec. In this example, the responder 706 may have been configured to handle recognized art15gdpr and intRec requesting grounds and include those requesting grounds in a considered list, and ignore an unrecognized extRec requesting ground and exclude that requesting ground from the considered list.

As yet another example, at 732, the responder 708 sends a work package response to the DPI service 712 that includes a list of considered requesting grounds that includes art15pdgr and intRec and an error list of unrecognized requesting grounds that includes an unrecognized extRec requesting ground. In this example, the responder 708 may have been configured to generate an error message for an unrecognized requesting ground rather than simply ignore the unrecognized requesting ground.

At 734, the DPI service 712 can handle received work package responses, such as aggregating information in the received work package responses. The DPI service 712 can also be configured (e.g., using standard processing and/or using customer-specific custom processing) to evaluate requesting ground information in received responses (e.g., with respect to which requesting grounds have been considered, for which requesting grounds an error was received, etc.). Custom DPI processing approaches are described in more detail below. As an example, the DPI service 712 may include either custom or standard logic to ensure that each responder successfully (e.g., without an error) considered and handled each requesting ground included in provided work packages. If the DPI service 712 determines, such as in the illustrated example, that not all responders successfully considered each provided requesting ground, the DPI service 712 can generate an error message, communicate relevant information to the requester 710, etc. For example, at 736, the DPI service 712 sends an iPDR response to the requester 710, which can include, for example, information regarding which responders considered which requesting grounds.

Having responders indicate which requesting grounds were considered can help the DPI service 712 and/or DPI administrators know how requests have been handled in situations where such conclusions might not otherwise have been possible. For example, for certain responders, a generated response might be the same as for both art15gdpr and art20gdpr requesting grounds. For instance, a responder might evaluate an article20gdpr requesting ground and determine that personal data retrieved for iPDR requests in general might not need further modification (and thus responses to art20gdpr requesting grounds might appear identical to responses to art15gdpr requesting grounds). To avoid confusion for users of DPI who may conclude that the responder is missing an implementation for art20gdpr, the responder can respond indicating that art20gdpr was considered, as described above. As another example, the responder 704 may provide extRec in the considered list, even if no external recipient information was identified, to inform the DPI service 712 that although no external recipient information is included in the work package response, external recipient evaluation was performed.

Figure 8:
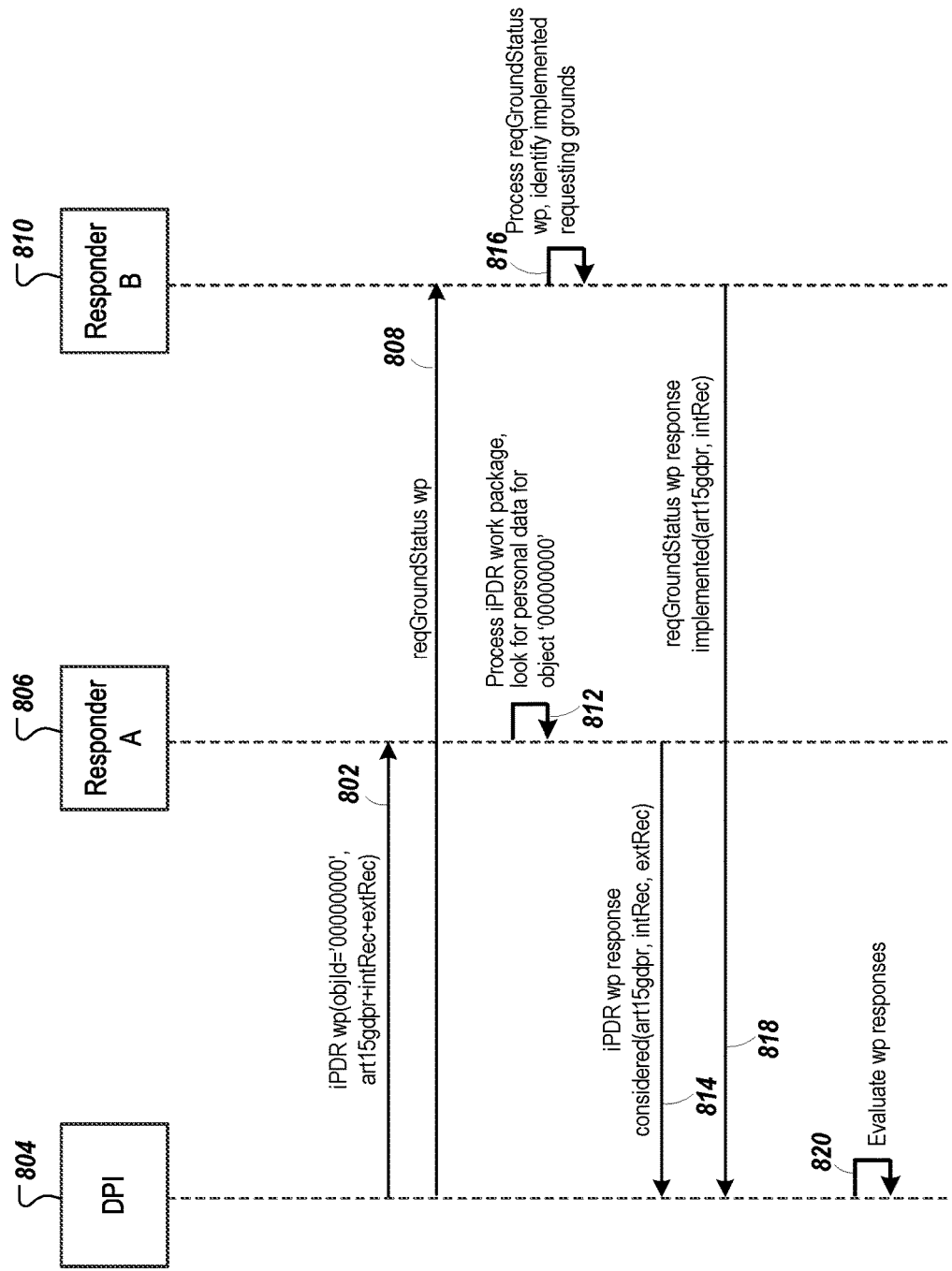

FIG. 8 is a swim lane diagram of an example process 800 for customizations of DPI processing using requesting grounds. In some implementations, responses to requests with requesting grounds may be evaluated by a DPI service as "heartbeat" information that indicates which requesting grounds are implemented in which responders. For example, the DPI service may send dedicated work packages to request from the responders information about implemented requesting grounds. As another example, the DPI service may send what are essentially empty work packages of a regular DPI work package type to see whether responders respond with indications of considered requesting grounds.

For instance, at 802, a DPI service 804 sends an iPDR work package to a responder 806 with a data subject object identifier of all zeros and art15gdpr, intRec, and extRec requesting grounds. At 808, as an example of another approach, the DPI service 804 sends a requesting ground status (e.g., "reqGroundStatus") work package to a responder 810 that requests the responder 810 to respond with information regarding requesting grounds currently handled by the responder 810.

At 812, the responder 806 attempts to find personal data for the "dummy"/fake object identifier of '00000000' and also performs any configured processing related to recognized and implemented requesting grounds. At 814, although no personal data is found by the responder 806, the responder 806 still sends a work package response to the DPI service 804 with the art15gdpr, intRec, and extRec requesting grounds included in a considered requesting grounds list.

At 816, the responder 810 handles the reqGroundStatus work package by identifying which requesting grounds are handled by the responder 810. At 818, the responder 810 sends a work package response to the DPI service 804 that indicates that the responder 810 has implemented handling of art15gdpr and intRec requesting grounds.

At 820, the DPI service 804 evaluates work package responses to determine which responders implement which requesting grounds. Although both "empty" and dedicated work package are illustrated as approaches for obtaining heartbeat information from responders, the DPI service 804 may select and use one approach. The DPI service 804 can provide information regarding which responders implement which requesting grounds to one or more recipients, such as an administrator or other DPI user, or to an automated process.

Figure 9:
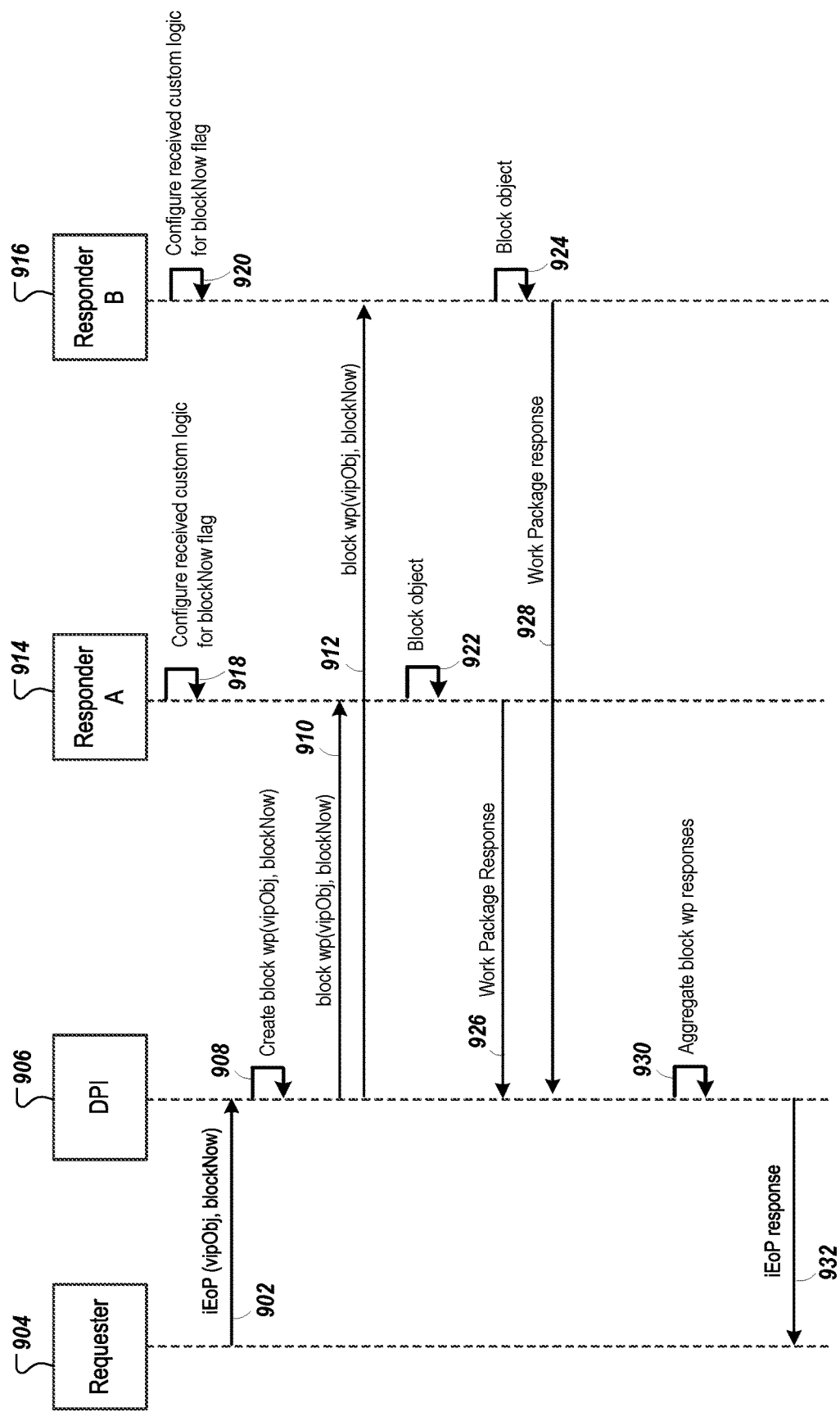

FIG. 9 is a swim lane diagram of an example process 900 for customizations of DPI processing using requesting grounds. Requesting grounds can be used for DPI protocols other than the iPDR protocol. For example, requesting grounds can be used for the iEoP protocol and/or the APD protocol (and other protocols).

For example, the president or head of a state may request the blocking of specific personal data. Such a request may be considered more important than adhering to retention periods (e.g., from the point of view of a data controller). Accordingly, a requesting ground may be included in a block work package within the iEoP protocol that is evaluated by all responders and understood in such a way (e.g., in an add-in implementation) that specified personal data is to be immediately blocked, independent of otherwise-configured retention periods. As another example, a requesting ground in an iEoP process may indicate that the data should be blocked with a retention period deviating from originally-configured retention periods. As yet another example, a requesting ground may be used to fine-tune the logic of local retention framework rules regarding whether end-of-purpose has been reached, such as to ensure that rules of a particular jurisdiction are applied in a specific iEoP ticket or to otherwise communicate different request priority or request handling considerations.

Referring to the illustrated example, at 902, a requester 904 sends an iEoP request to a DPI service 906. The iEoP request is for an object (e.g., "vipObj") that represents a VIP (Very Important Person), such as a head of state. The iEoP request includes or is otherwise associated with a requesting ground of "blockNow". At 908, the DPI service 906 can create a block work package (e.g., "wp").

At 910 and 912, the DPI service 906 sends the block work package to a responder 914 and a responder 916, respectively. The responders 914 and 916 may have previously received (e.g., at 918 and 920, respectively) custom logic for handling blockNow (and possibly other) requesting grounds. The custom logic may be replacement logic (e.g., to unconditionally block an object associated with the blockNow requesting ground) or, for example, post-processing logic to override retention period consideration that may have been performed by a given responder to override such processing to reach a conclusion of "can-block-now". In any case, the configuration of custom logic by both the responder 914 and the responder 916 can be performed to ensure that the vipObj object associated with the blockNow requesting ground is blocked immediately in response to the work package. For example, at 922 and 924, the responder 914 and the responder 916 block the object, respectively. At 926 and 928, the responder 914 and the responder 916 provide a work package response (e.g., indicating successful blocking of the object) to the DPI service 906, respectively. At 930, the DPI service 906 determines an aggregate status (e.g., blocking success) based on information received from multiple responders. At 932, the DPI service 906 sends a response to the iEoP request (e.g., indicating successful blocking of the object) to the requester 904.

Figure 10:
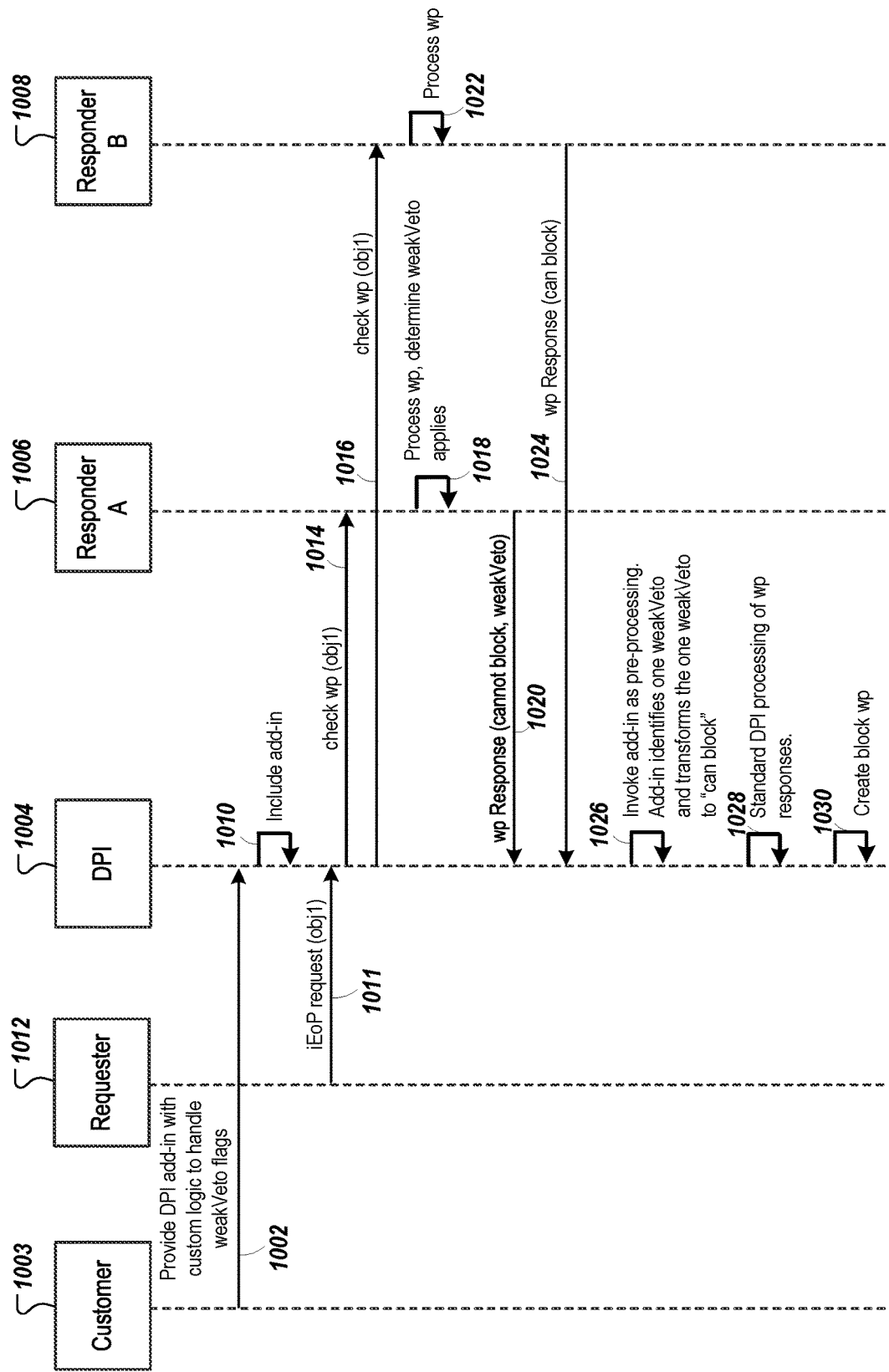

FIG. 10 is a swim lane diagram of an example process 1000 for customizations of DPI processing using responder feedback flags. At 1002, a customer 1003 that uses a DPI service 1004 and responder applications 1006 and 1008 that participate in DPI protocols with the DPI service 1004 provides a customer-specific add-in to/for the DPI service 1004. The customer-specific add-in includes custom logic to handle "weak Veto" flags that may be included in responder-provided information to the DPI service 1004 as responder feedback flags. Weak vetoes are described below. At 1010, the DPI service 1004 incorporates (e.g., configures) the received add-in for the customer 1003 so that the add-in is enabled for the customer 1003.

At 1011, a requester 1012 (which may be another application used by the customer 1003 (or may be the responder 1006 or responder 1008 acting in a requester role) sends an iEoP request for an object to the DPI service 1004. The DPI service 1004 recognizes that the iEoP request is associated with the customer 1003. At 1014 and 1016, the DPI service 1004 sends, to the responder 1006 and the responder 1008, respectively, a check work package for the object.

At 1018, the responder 1006 processes the check work package and determines (e.g., in a customer-specific add-in that can be received and configured similar to other responder add-ins described above) that a scenario/situation relevant to a concept of a "weak Veto" applies. A "weak veto" scenario is one in which the responder considers that its veto vote (e.g., cannot block the object) should apply only if at least one other responder also has a weak veto conclusion. After detecting its weak veto situation, the responder 1006 can include, in a work package response, a "weakVeto" responder feedback flag. At 1020, the responder 1006 sends a work package response, with a veto (e.g., cannot block) vote and the weak veto responder feedback flag, to the DPI service 1004.

At 1022, the responder 1008 processes the check work package received from the DPI service 1004. The responder 1008 can determine a can-block vote for the object included in the check work package. For example, the responder 1008 may not have concluded that a weak veto situation exists in the responder 1008, based, for example, on executing logic in a responder-specific add-in or simply based on the responder 1008 not having any responder-specific logic for weak veto analysis. The customer may have determined that the responder 1008 is not relevant for weak veto analysis (while other responders may be relevant), for example. At 1024, the responder 1008 sends a work package response, with a can-block vote, to the DPI service 1004.

At 1026, the DPI service 1004 can invoke the customer add-in received from the customer 1003 at step 1002, for example, as pre-processing to be performed before standard DPI processing of received check work package responses. The customer add-in can identify one weak veto responder feedback flag (e.g., from the responder 1006) and may determine that no other weak veto responder feedback flags are included in any other responder check work package responses. Accordingly, the customer add-in can transform the cannot-block vote of the responder 1006 to a can-block vote (e.g., since the weak veto logic in the customer add-in can be configured to keep weak vetoes as actual vetoes only if multiple weak vetoes are received).

At 1028, the DPI service 1004 performs standard iEoP processing of received responder votes (including consideration of the now can-block vote of the responder 1006). The DPI service 1004 can determine, for example, that all responders have voted can-block for the object. Accordingly, at 1030, the DPI service 1004 can create a block work package for the object (and send the block work package to responders, and continue on with regular iEoP protocol processing).

Figure 11:
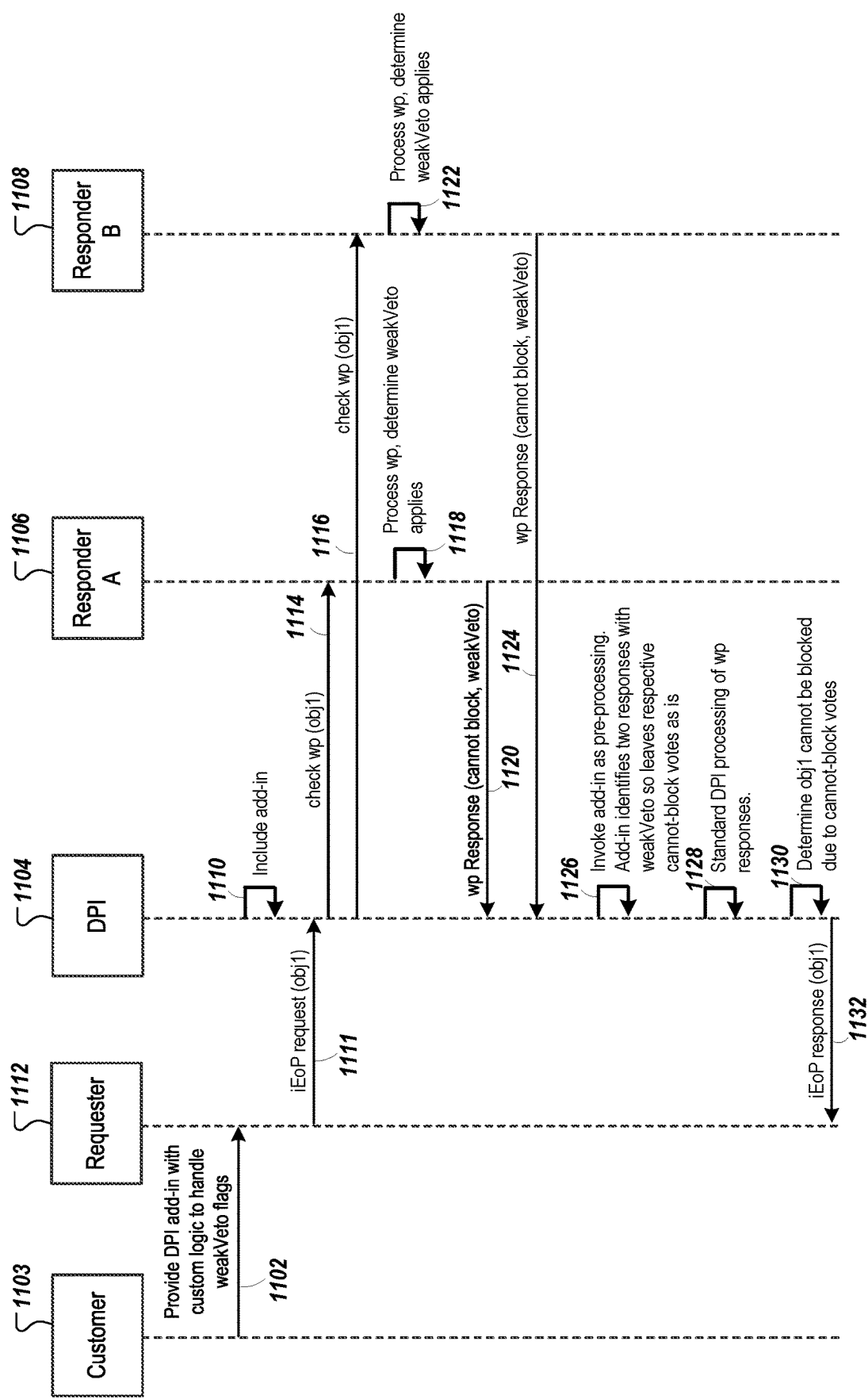

FIG. 11 is a swim lane diagram of an example process 1100 for customizations of DPI processing using responder feedback flags. The process 1100 is similar to the process 1000 described above with respect to FIG. 10. At 1102, a customer 1103 that uses a DPI service 1104 and responder applications 1106 and 1108 provides a customer-specific add-in to the DPI service 1104. The customer-specific add-in includes custom logic to handle "weak Veto" responder feedback flags. At 1110, the DPI service 1104 incorporates (e.g., configures) the received add-in for the customer 1103 so that the add-in is enabled for the customer 1103.

At 1111, a requester 1112 sends an iEoP request for an object to the DPI service 1104. The DPI service 1104 recognizes that the iEoP request is associated with the customer 1103. At 1114 and 1116, the DPI service 1104 sends, to the responder 1106 and the responder 1108, respectively, a check work package for the object.

At 1118, the responder 1106 processes the check work package and determines (e.g., in a customer-specific add-in) that a scenario/situation relevant to a concept of a "weakVeto" applies. At 1120, the responder 1106 sends a work package response, with a veto (e.g., cannot block) vote and the weak veto responder feedback flag, to the DPI service 1104. Similarly, at 1122, the responder 1108 processes the check work package and determines (e.g., in a customer-specific add-in) that a scenario/situation relevant to a concept of a "weakVeto" also applies in the responder 1108. At 1124, the responder 1108 sends a work package response, with a veto (e.g., cannot block) vote and the weak veto responder feedback flag, to the DPI service 1104.

At 1126, the DPI service 1104 can invoke the customer add-in received from the customer 1103 at step 1102, for example, as pre-processing to be performed before standard DPI processing of received check work package responses. The customer add-in can identify two weak veto responder feedback flags (e.g., from the responders 1106 and 1108). Accordingly, the customer add-in can maintain the cannot-block votes of the responders 1106 and 1108 (e.g., since the weak veto logic in the customer add-in can be configured to keep weak vetoes as actual vetoes if multiple weak vetoes are received).

At 1128, the DPI service 1104 performs standard iEoP processing of received responder votes. The DPI service 1104 can determine, for example, that a consensus can-block vote cannot be determined for the object. Accordingly, at 1130, the DPI service 1104 can determine that the object cannot be blocked (e.g., at least due to the cannot-block votes of the responders 1106 and 1108). At 1132, the DPI service sends an iEoP response to the requester 1112 (e.g., indicating that the object cannot be and has not been blocked).

FIG. 12 is a swim lane diagram of an example process 1200 for customizations of DPI processing using responder feedback flags. At 1202, a customer 1203 that uses a DPI service 1204 and responder applications 1206 and 1208 provides a customer-specific add-in to the DPI service 1204. The customer-specific add-in includes custom logic to handle "ultimate" responder feedback flags which can provide a mechanism for a given responder to indicate that an object should be blocked, irrespective of votes of other responders. At 1210, the DPI service 1204 incorporates (e.g., configures) the received add-in for the customer 1203 so that the add-in is enabled for the customer 1203.

At 1211, a requester 1212 sends an iEoP request for an object to the DPI service 1204. The DPI service 1204 recognizes that the iEoP request is associated with the customer 1203. At 1214 and 1216, the DPI service 1204 sends, to the responder 1206 and the responder 1208, respectively, a check work package for the object. At 1218, the responder 1206 processes the check work package and determines that the responder 1206 cannot block the object. Accordingly, at 1220, the responder 1206 sends a work package response, with a cannot-block vote, to the DPI service 1204.

At 1222, the responder 1208, which may be a veto service, processes the work package. The responder 1208 may be an automated process that has been configured, at least in part, to determine whether an overriding condition occurs in which the object should be blocked, irrespective of votes of other responders. In some cases, the responder 1208 can include logic to provide information to a human auditor, and the human auditor can determine a can-block or cannot-block vote, and for cannot-block votes, whether the cannot-block vote should supersede other responder votes. In the illustrated example, the responder 1208 has determined that the object should be blocked, irrespective of other responder votes. Accordingly, at 1224, the responder 1208 sends a work package response, with a cannot-block vote and an "ultimate" responder feedback flag, to the DPI service 1204.

At 1226, the DPI service 1204 can invoke the customer add-in received from the customer 1203 at step 1202, for example, as pre-processing to be performed before standard DPI processing of received check work package responses. The customer add-in can identify the ultimate responder feedback flag received from the responder 1208. Accordingly, the add-in can change all cannot-block responder votes to can-block.

At 1228, the DPI service 1204 performs standard DPI processing of responder votes. For example, the DPI service 1204 can determine that the object can be blocked, since all responder votes are now can-block. At 1230, the DPI service 1204 creates a block work package for the object (and continues with the iEoP protocol, by sending the block work package to responders, etc.).

Figure 13A:
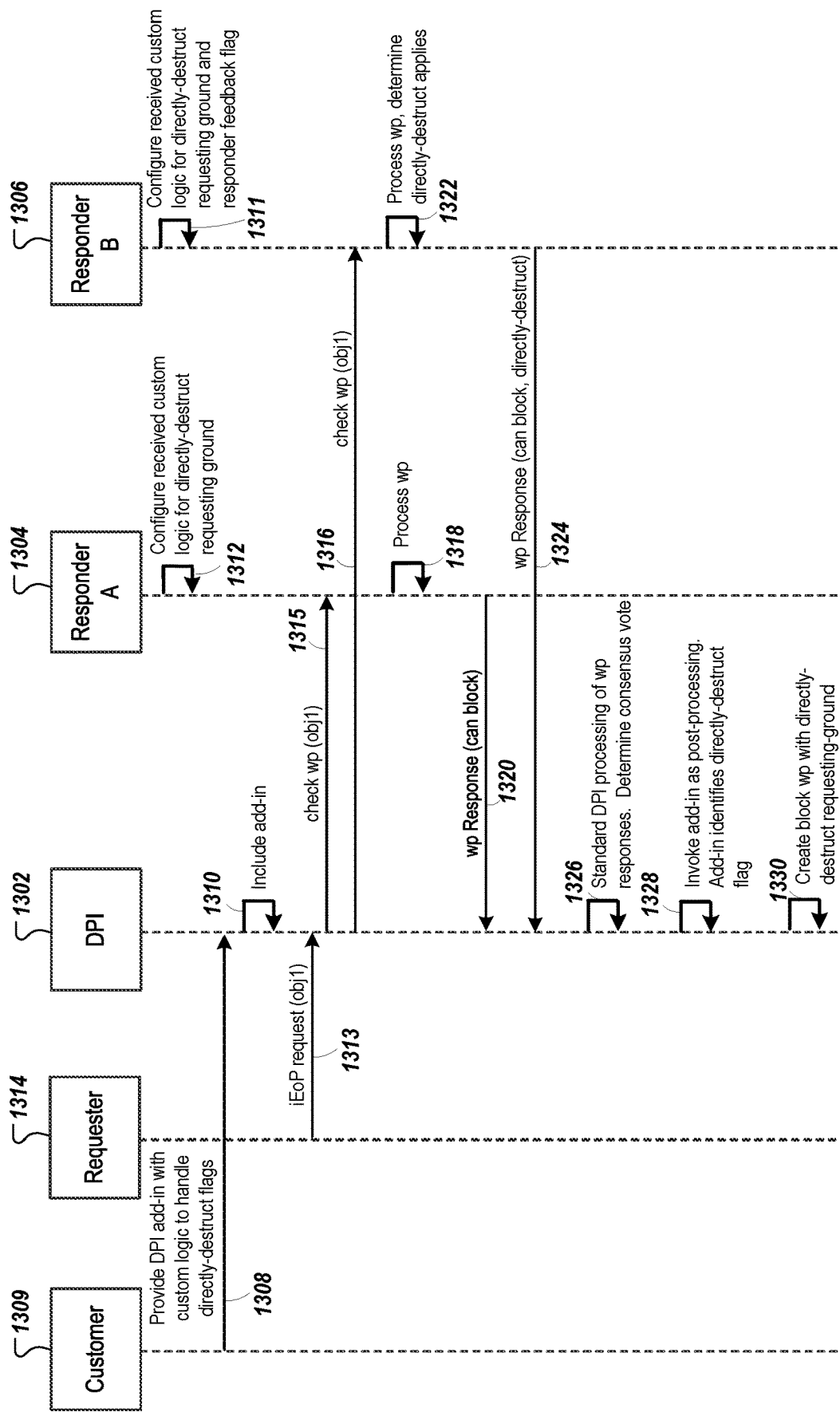
FIGS. 13A-B are a swim lane diagram of an example process for customizations of DPI processing using both responder feedback flags and requesting grounds.
Figure 13B:
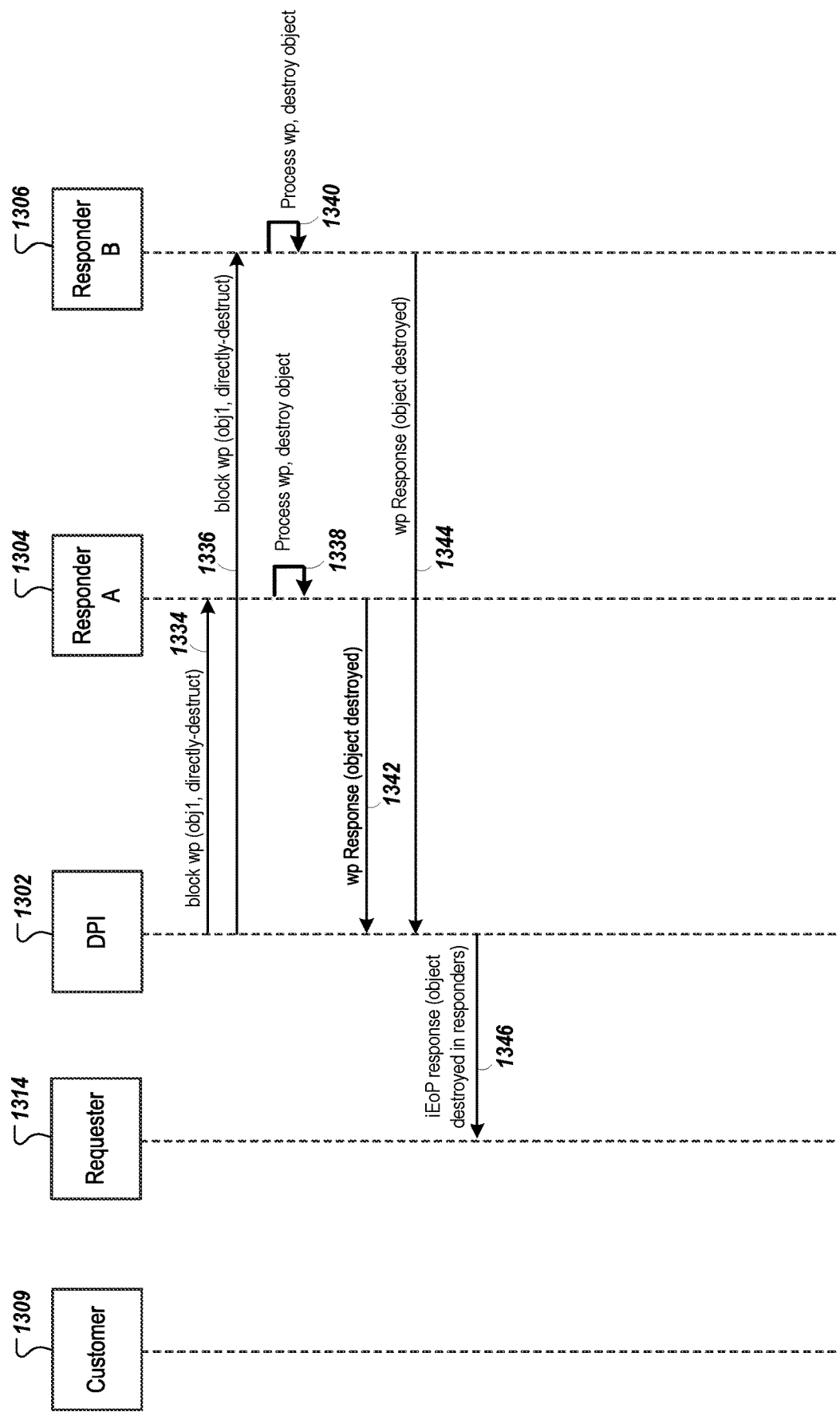

FIGS. 13A-B are a swim lane diagram of an example process 1300 for customizations of DPI processing using both responder feedback flags and requesting grounds. That is, the use of both responder feedback flags and requesting grounds enables bidirectional communication between a DPI service 1302 and responders 1304 and 1306 to handle different types of scenarios.

For example, at 1308, a customer 1309 that uses the DPI service 1302 and the responders 1304 and 1306 provides a customer-specific DPI add-in to the DPI service 1302. At 1310, the DPI service 1302 incorporates (e.g., configures) the received DPI add-in for the customer 1309 so that the DPI add-in is enabled for the customer 1309. The customer-specific DPI add-in includes custom logic to handle "directly-destruct" responder feedback flags which can provide a mechanism for a given responder to notify about a directly-destruct scenario in which an object not only can be blocked but should be directly destructed (e.g., rather than maintain the object according to any applicable retention periods). For instance, the customer may have identified that in certain situations destructing data may correct certain compliance or other issues that may be more serious than deleting personal data sooner than may be necessary. The DPI add-in can also be configured to communicate instructions (or configured to adjust the DPI service 1302 to communicate instructions) via a directly-destruct requesting ground that instructs responders to directly destruct an object in response to the DPI service 1302 receiving a directly-destruct responder feedback flag. In other words, both a responder feedback flag and a requesting ground can be used to bidirectionally communicate custom instructions in the landscape to/from both the DPI service 1302 and applicable responders. Although in this example both the responder feedback flag and the requesting ground are named "directly-destruct" (e.g., to reflect the communication of directly-destruct situations or instructions within the landscape), in some examples other scenarios can use other types or combinations of responder feedback flags and requesting grounds that may not share a same name or identifier.

Continuing with the illustrated example, at 1311, the responder 1306 configures custom logic (e.g., in or as a responder add-in) for identifying directly-destruct scenarios and other logic for handling directly-destruct requesting grounds that may be received by the DPI service 1302. The customer 1309 may have identified that the responder 1306 may be a source for determining a direct destruct scenario, for example, and the customer 1309 can provide custom logic for identifying the direct destruct scenario. In some cases, the responder 1306 may be a veto service that is or interfaces with a human administrator. In other cases the responder 1306 may be an automated process or application.

At 1312, the responder 1304 configures received custom logic (e.g., received from the customer 1309) for handling direct-destruct requesting grounds from the DPI service 1302. The customer 1309 may know that the responder 1304 is not a source for determining a direct-destruct scenario so the customer 1309 may provide custom logic for responding to the direct-destruct requesting ground but not logic for generating a direct-destruct responder feedback flag.

The remainder of the FIG. 13A-B example illustrates application of the direct-destruct responder feedback flag and requesting ground. For instance, at 1313, a requester 1314 sends an iEoP request for an object to the DPI service 1302. The DPI service 1302 recognizes that the iEoP request is associated with the customer 1309. At 1315 and 1316, the DPI service 1302 sends, to the responder 1304 and the responder 1306, respectively, a check work package for the object. At 1318, the responder 1304 processes the check work package and determines that the responder 1304 can block the object. Accordingly, at 1320, the responder 1304 sends a work package response, with a can-block vote, to the DPI service 1302.

At 1322, the responder 1306, which may be a veto service, processes the work package (e.g., based at least in part using the custom logic received at step 1311) and determines that a directly-destruct scenario applies (e.g., where the directly-destruct scenario is a scenario or condition in the responder 1306 determines or is informed (e.g., by an administrator) that the object in the work package should be directly destructed without considering retention periods). In some cases, automated logic determines the directly-destruct scenario and in other cases the responder 1306 is or interfaces with an administrative application which receives from a human auditor an indication of the directly-destruct scenario.

At 1324, the responder 1306 sends a work package response, with a can-block vote and a directly-destruct responder feedback flag, to the DPI service 1302. At 1326, the DPI service 1302 performs standard DPI processing for handling received check work package responses. For example, the DPI service 1302 can determine that each responder has provided a can-block vote for the object. At 1328, the DPI service 1302 invokes the DPI add-in received at step 1308 as a post-processing step (e.g., processing that occurs after standard DPI processing). The DPI add-in can identify that the responder 1306 provided a directly-destruct responder feedback flag. Accordingly, the DPI add-in can configure the DPI service 1302 so that a subsequently-created block work package includes a directly-destruct requesting ground to communicate to responders that the responders should directly destruct the object (e.g., rather than block the object which may involve retention periods).

At 1330, the DPI service 1302 creates a block work package for the object that includes or is associated with a directly-destruct requesting ground. The DPI service 1302 may create a block work package rather than a new type of work package because adding a new type of work package (e.g., a new "destruct object(s) work package") may involve substantial modification to the DPI service 1302 and to responders. By including a requesting ground in or with an existing work package type the work package can be sent to all responders, with responders that recognize the requesting ground being able to respond appropriately if those responders have custom logic for the requesting ground and with responders that don't recognize the requesting ground simply being able to ignore the requesting ground.

Referring now to FIG. 13B, at 1334 and 1336, the DPI service 1302 sends, to the responder 1304 and the responder 1306, respectively, a block work package for the object that includes or is associated with a directly-destruct requesting ground. At 1338 and 1340, respectively, the responder 1304 and the responder 1306 each process the block work package, identify (e.g., using custom logic) the directly-destruct requesting ground, and, in response to identifying the directly-destruct requesting ground, destroy the object in the respective responder. At 1342 and 1344, respectively, the responder 1304 and the responder 1306 each send an indication to the DPI service 1302 indicating that the object was destroyed. At 1346, the DPI service 1302 sends an iEoP response to the requester 1314 that indicates that the object was destroyed.

Figure 14:
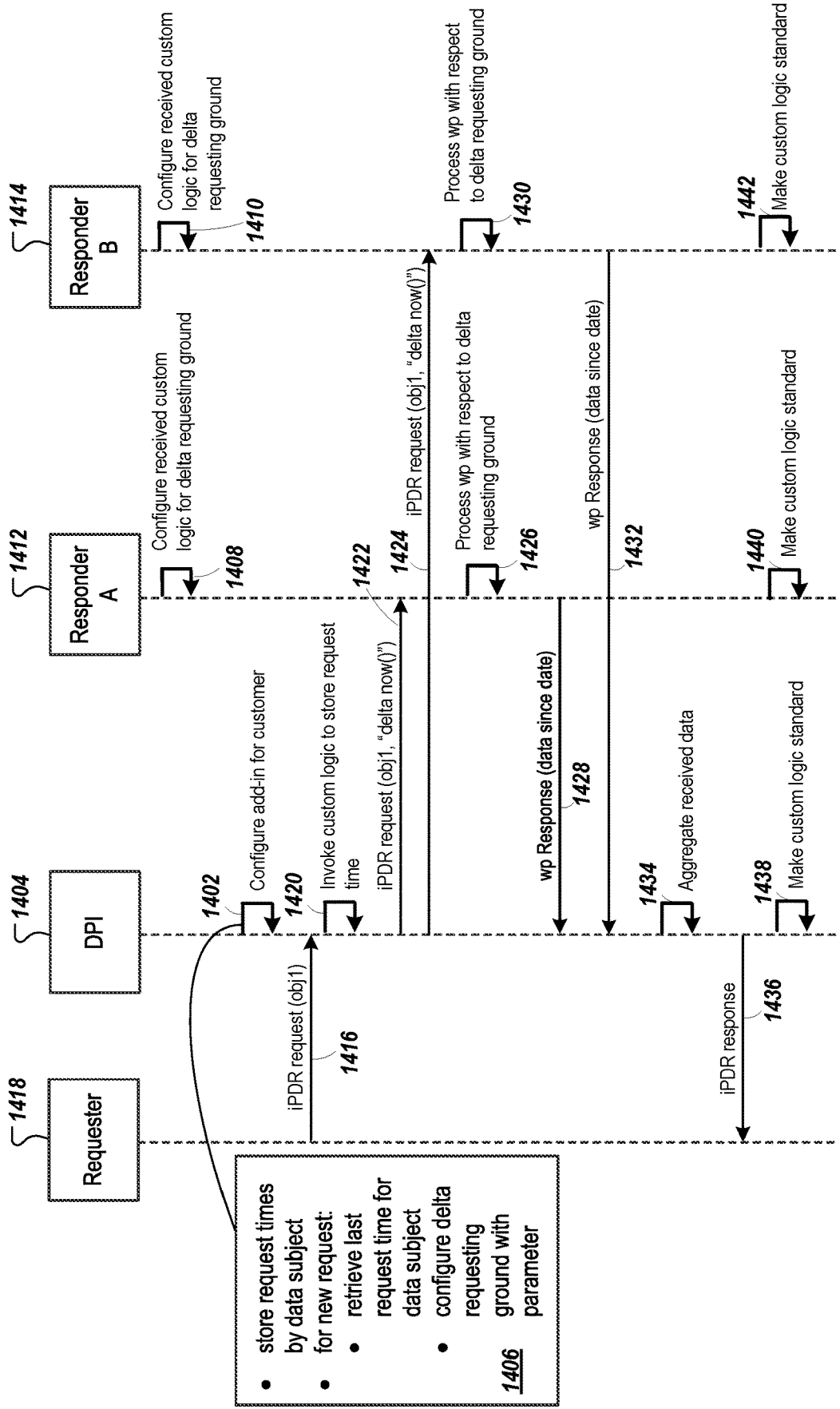
FIGS. 14-16 are swim lane diagrams of example processes for customizations of DPI processing.

FIG. 14 is a swim lane diagram of an example process 1400 for customizations of DPI processing. At 1402, a DPI service 1404 configures custom logic 1406 for a particular customer. The customer may have requested certain custom processing, for example, and worked with the provider of the DPI service 1404 to have the custom logic configured for the customer. The custom logic 1406 is structured so that the DPI service 1404 stores request times (e.g., for the iPDR protocol) per data subject. Additionally, the custom logic 1406 is configured so that a requesting ground "delta" is configured to be sent with a parameter that indicates a last request time.

Responders can be configured to handle the delta requesting ground by retrieving only personal data for a data subject that has changed since a date corresponding to the last request time parameter. For example, at 1408 and 1410, a requester 1412 and a requester 1414 each receive and configure custom logic for the customer for handling the delta requesting ground.

At 1416, a requester 1418 associated with the customer sends an iPDR request for an object to the DPI service 1404. The DPI service 1404 recognizes that the request is for the customer. At 1420, the DPI service 1404 executes a portion of the custom logic 1406 to store a request time in association with the data subject represented by the object included in the iPDR request.

At 1422 and 1424, the DPI service 1404 sends, to the responder 1412 and the responder 1414, respectively, an iPDR work package that includes the delta requesting ground and its associated request time parameter. The responders 1412 and 1414 may have each configured received custom logic for handling the delta requesting ground in different ways, such as a post-processing option that is invoked after standard iPDR processing has been performed by the respective responder (e.g., to remove any retrieved data with a modification date earlier than the request time parameter) or as replacement processing that only retries data with a modification date after the request time parameter). In this example, custom handling of the delta parameter is described as replacement processing of standard iPDR processing.

At 1426, the responder 1412 invokes the custom logic it received, as replacement processing, to process the work package with respect to the delta requesting ground and its corresponding request time parameter. At 1428, the responder 1412 sends a work package response to the DPI service 1404 that includes personal data for the data subject that has been modified since the previous request time.

Similar to the processing of the responder 1412, at 1430, the responder 1414 invokes the custom logic it received, as replacement processing, to process the work package with respect to the delta requesting ground and its corresponding request time parameter. At 1432, the responder 1414 sends a work package response to the DPI service 1404 that includes personal data for the data subject that has been modified since the previous request time.

At 1434, the DPI service 1404 aggregates information received from all responders (e.g., including information received from the responder 1412 and the responder 1414). At 1436, the DPI service 1404 sends an iPDR response to the requester 1418, in response to the received iPDR request.

As mentioned, the customer may have requested configuration of the custom logic 1406. The provider of the DPI service 1404 may have agreed to help the customer configure the custom logic 1406, e.g., in or as a pilot program. After review of the pilot program, the software provider may determine or decide to include the custom logic 1406 for all (or at least additional) customers that interface with the DPI service 1404. Other customer may use the DPI service 1404 and the responders 1412 and 1414, for example. Accordingly, at 1438, the software provider may adjust the DPI service so that the custom logic 1406 is configured for additional customers. Additionally, at 1440 and 1442, the software provider can configure the responders 1412 and 1414, respectively, so that logic for handling received delta requesting grounds is configured for the additional customers. In some cases, the delta requesting ground is modified to include a namespace that indicates that the requesting ground is now a general requesting ground for the software provider (and no longer a customer-specific requesting ground). For example, the DPI service 1404 and the responders 1412 and 1414 can now refer to the delta requesting ground as "ABCSW:delta" (e.g., based on an example of the software provider being named "ABC software (SW)".

As another example related to the previously described "intRec" requesting ground, the software provider may eventually determine that exporting information about internal recipients is generally applicable to customers that intRec should now be included as a more general "ABCSW: intRec" requesting ground in an ABCSW namespace, with a corresponding standard implementation. Additionally, the ABCSW: intRec requesting ground may be supported in the standard implementation of responders, without requiring any customer-specific add-in implementation.

Figure 15:
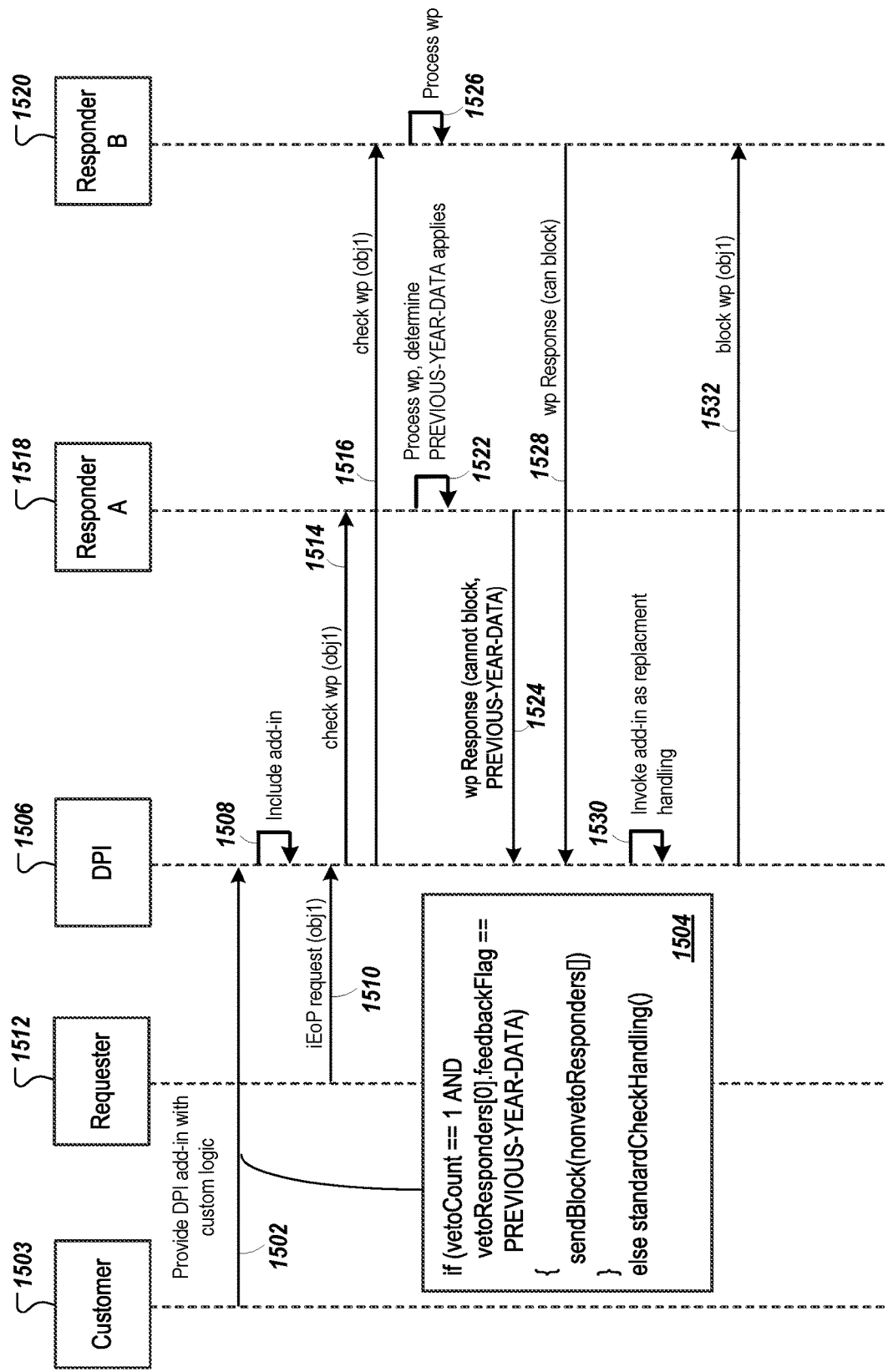

FIG. 15 is a swim lane diagram of an example process 1500 for customizations of DPI processing. In some implementations, responders can provide responder feedback flags that provide details regarding why a veto was raised. For example, a responder can indicate, in a responder feedback flag, of which object type personal data is still present within the responder that prevents from blocking. The object type may be set as a feedback flag, depending on the data controller's needs. Custom processing within a DPI service can be executed, for example, to determine that if only data of a specific object type is present that prevents blocking other responders may still be able to block master data. Responders can also provide other information in responder feedback flags that indicate other conditions of data that can't be blocked, and custom processing provided to the DPI service can tailor processing that may affect remaining DPI processing of a request.

For instance, in the illustrated example at 1502, a customer 1503 provides custom logic 1504 to a DPI service 1506. The custom logic 1504 is configured such that if only one responder has provided a veto vote and that responder has provided a responder feedback flag that indicates that previous year data cannot be blocked then other responders can be instructed (e.g., using a block command) to block the data.

At 1508, the DPI service 1506 incorporates (e.g., configures) the received custom logic 1504 for the customer 1503 (e.g., as a DPI add-in) so that the custom logic 1504 is enabled for the customer 1503. At 1510, a requester 1512 associated with the customer 1503 sends an iEoP request for an object to the DPI service 1506. The DPI service 1506 recognizes that the iEoP request is associated with the customer 1503. At 1514 and 1516, the DPI service 1506 sends, to a responder 1518 and a responder 1520, respectively, a check work package for the object. At 1522, the responder 1518 processes the check work package and determines that the responder 1518 cannot block the object. The responder 1518 may not be at end of purpose due to possible upcoming audit processing of prior year data, for example. Accordingly, at 1524, the responder 1518 sends a work package response, with a cannot-block vote and a PREVIOUS-YEAR-DATA responder feedback flag, to the DPI service 1506.

At 1526, the responder 1520 processes the check work package and determines that the responder 1520 can block the object. Accordingly, at 1528, the responder 1520 sends a work package response with a can-block vote to the DPI service 1506. This example illustrates that although some responders (e.g., the responder 1518) may provide responder feedback flags, other responders (e.g., the responder 1520) may send a work package response to a same work package without providing a responder feedback flag.

At 1530, the DPI service 1506 invokes the custom logic 1504 for the customer, as a replacement for standard DPI processing, to handle responses to the check work package. In this example, the if-statement in the custom logic 1504 evaluates to a true value (e.g., only one veto vote with a responder feedback flag of PREVIOUS-YEAR-DATA). Accordingly, at 1532, the DPI service 1506 sends a block work package to the responder 1520 instructing the responder 1520 to block the object even though the responder 1518 provided the veto vote. Note that in this example, if the if-statement had evaluated to false, the custom logic 1504 is configured to process the check work packages according to standard DPI processing.

Figure 16:
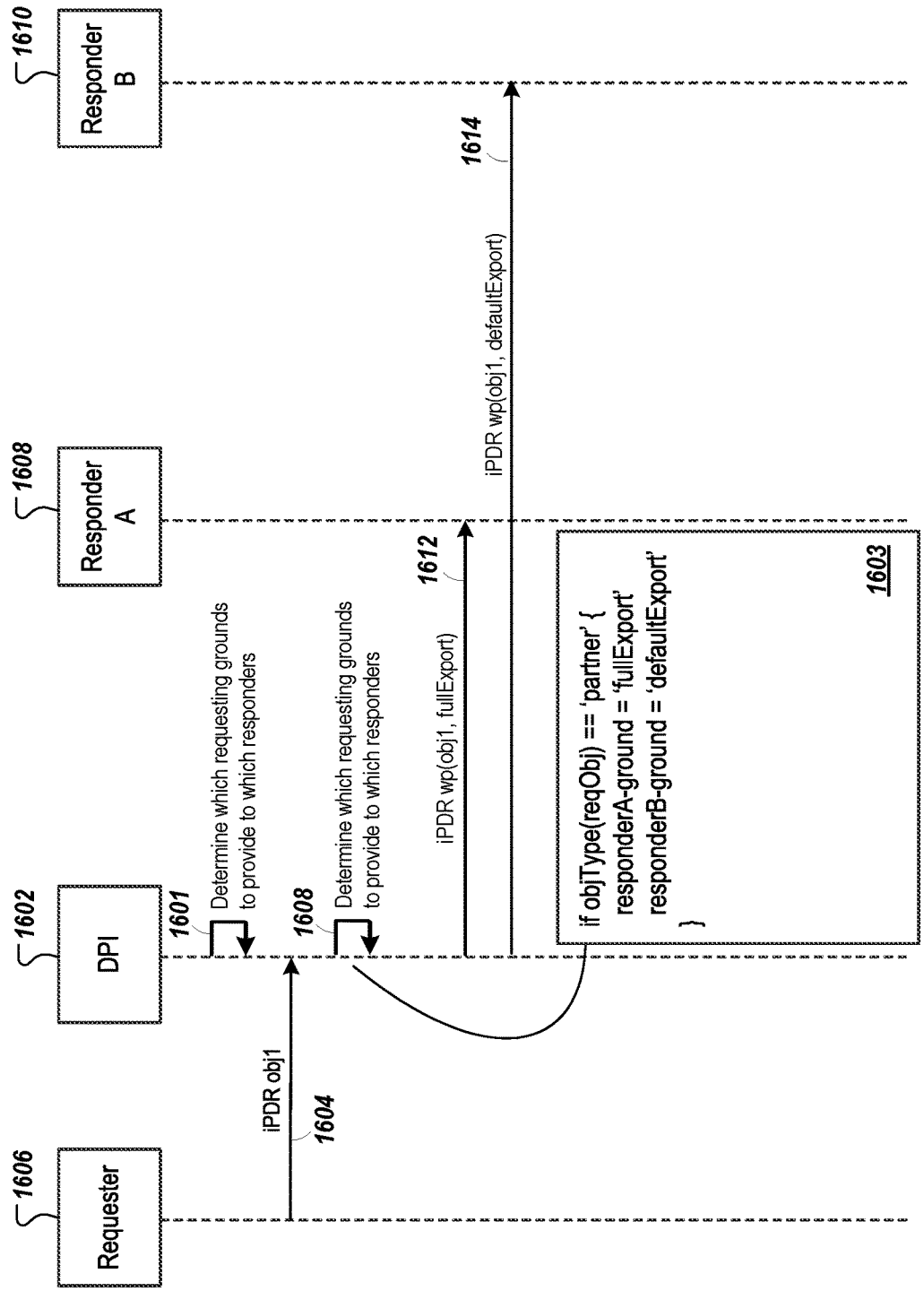

FIG. 16 is a swim lane diagram of an example process 1600 for customizations of DPI processing. In some implementations, a customer may provide custom logic to implement custom DPI processing for determining which requesting grounds are to be applied when executing a ticket. In some cases, customer custom logic can determine which of different requesting grounds to provide to which responders.

For example, at 1601, a DPI service 1602 receives and incorporates custom logic 1603 from a customer for determining which requesting ground to provide to which responder based on an object type of an iPDR request.

At 1604, the DPI service 1602 receives an iPDR request for an obj1 object from a requester 1606. The DPI service 1602 recognizes that the request is from the customer who provided the custom logic.

At 1608, the DPI service 1602 executes the custom logic 1603 to determine which requesting grounds to provide to a responder 1610 and a responder 1612. For example, if an object type of the object in the iPDR request is 'partner' then the custom logic 1603 specifies that the responder 1608 is to receive a "fullExport" requesting ground and the responder 1610 is to receive a "defaultExport" requesting ground. The responders 1608 and 1610 can be configured to recognize and handle those respective requesting grounds.

At 1612, the DPI service 1602 sends an iPDR work package with requesting ground of fullExport to the responder 1608. At 1614, the DPI service 1602 sends an iPDR work package with requesting ground of defaultExport to the responder 1610. The responders 1608 and 1610 and the DPI service 1602 can continue the iPDR protocol, with handling of work packages with different requesting grounds, work package responses, and iPDR responses, etc.

Figure 17:
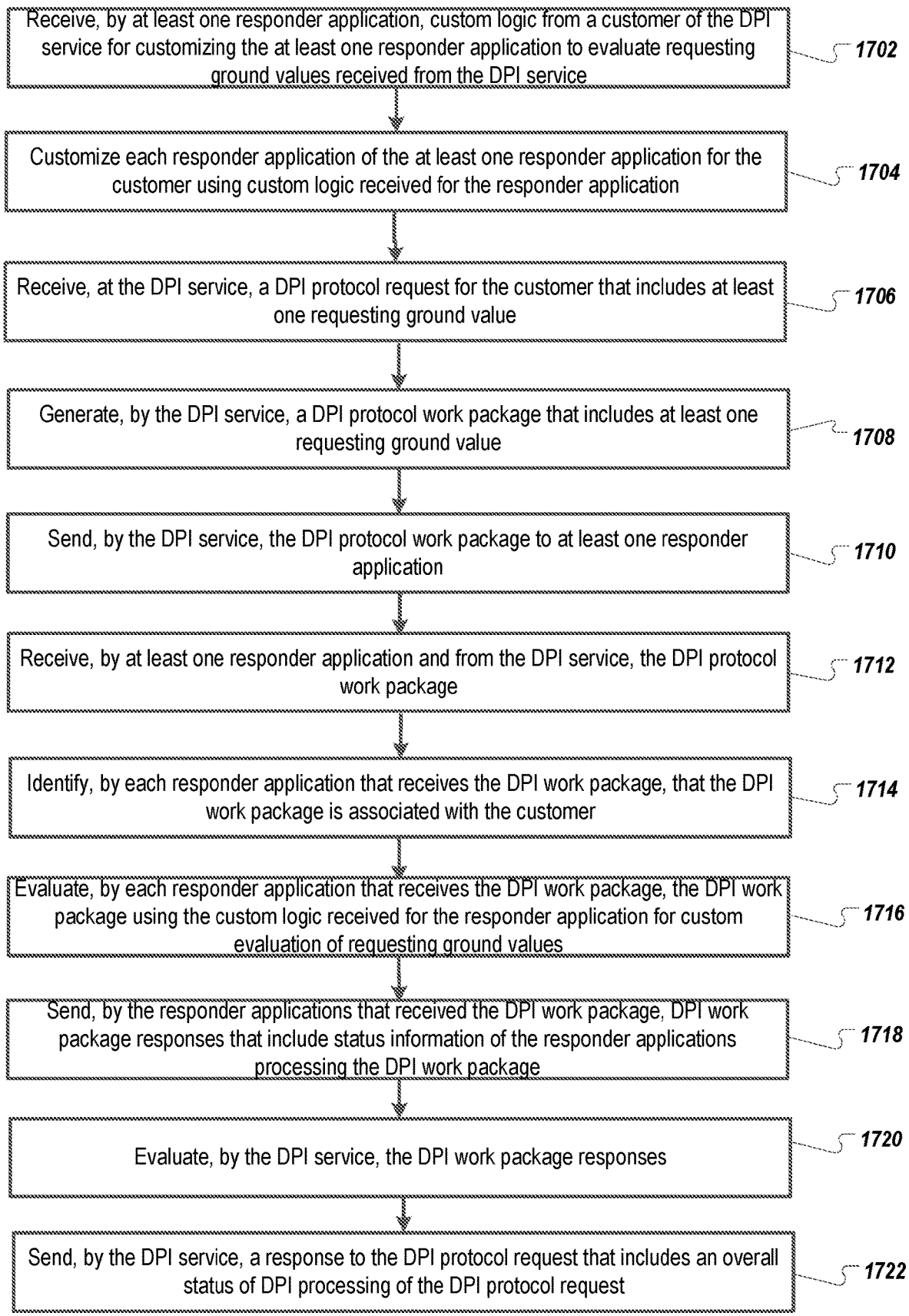
FIGS. 17-18 are flowcharts of example methods for customizing DPI protocols.

FIG. 17 is a flowchart of an example method 1700 for customizing DPI protocols. It will be understood that method 1700 and related methods may be performed, for example, by any suitable system, environment, software, and hardware, or a combination of systems, environments, software, and hardware, as appropriate. For example, one or more of a client, a server, or other computing device can be used to execute method 1700 and related methods and obtain any data from the memory of a client, the server, or the other computing device. In some implementations, the method 1700 and related methods are executed by one or more components of the system 100 described above with respect to FIG. 1. For example, the method 1700 and related methods can be executed by the server 102 of FIG. 1.

At 1702, custom logic from a customer is received by at least one responder application in a multiple-application landscape that includes multiple responder applications that respond to DPI requests from a DPI service. The custom logic from the customer of the DPI service is for customizing the at least one responder application to evaluate requesting ground values received from the DPI service.

At 1704, each responder application of the at least one responder application is customized for the customer using custom logic received for the responder application to configure the at least one responder application to evaluate at least one requesting ground value. Customizing a first responder application using first custom logic received for the first responder application can include configuring an add-in for the customer in the first responder application.

At 1706, a DPI protocol request for the customer that includes at least one requesting ground value is received at the DPI service. The DPI protocol request can be an integrated personal data retrieval request for personal data stored for a data subject in the multiple-application landscape. The at least one requesting ground value can be provided to the DPI service as at least one parameter of an API of the DPI service. The DPI service can validate the at least one requesting ground value to determine that the DPI service recognizes each requesting ground value and the at least one requesting ground value does not include any incompatible requesting ground values. The DPI service can translate, for at least one responder application, a received requesting ground value into a synonymous requesting ground value understood by at least one responder application. The DPI service can expand a first composite requesting ground value into multiple atomic requesting ground values understood by at least one responder application.

At 1708, a DPI protocol work package that includes at least one requesting ground value is generated by the DPI service. The DPI service can identify a first parameter for a first requesting ground value and include the first parameter with the first requesting ground value in the DPI protocol work package. In some examples, the DPI service can determine which requesting ground values to provide to which responder applications. For instance, the DPI service can determine to include a first set of requesting ground values to provide to a first responder application and a second set of requesting ground values to provide to a second responder application, where the first set of requesting ground values includes different requesting ground values than the second set of requesting ground values. In some implementations, the DPI service can receive custom logic from the customer of the DPI service for determining which requesting ground values to provide to which responder applications. The DPI service can be customized for the customer using the custom logic received from the customer for determining which requesting ground values to provide to which responder applications.

At 1710, the DPI service sends the DPI protocol work package to at least one responder application.

At 1712, at least one responder application receives, from the DPI service, the DPI protocol work package.

At 1714, each responder application that receives the DPI work package identifies that the DPI work package is associated with the customer.

At 1716, in response to identifying that the DPI work package is associated with the customer, each responder application that receives the DPI work package evaluates the DPI work package using the custom logic received for the responder application for custom evaluation of requesting ground values.

Regarding the iPDR protocol, the custom logic received by a first responder application can include logic to add personal data to, remove personal data from, or modify personal data retrieved for the data subject by standard DPI processing performed by the first responder application. The first responder application can perform the custom logic by either including or excluding internal or external recipient information of recipients to which personal data of the data subject was provided. A first requesting ground value received by a first responder application can identify a particular legal basis for the data subject to request personal data.

In general, a first responder application can evaluate the DPI work package using the custom logic received for the first responder application by one of: a) performing custom evaluating as pre-processing before performing standard DPI processing of the DPI work package; b) performing custom evaluating as post-processing after performing standard DPI processing of the DPI work package; c) performing the evaluating as replacement processing instead of performing standard DPI processing of the DPI work package; or d) performing pre-processing, standard processing, and post-processing of the DPI work package, wherein standard DPI processing comprises processing configured for multiple customers of the DPI service and custom evaluating comprises processing specific to the customer. As an example, a first responder application can invoke an external service external to the first responder application to process the DPI work package and perform custom evaluation of the at least one requesting ground value received by the first responder application.

At 1718, the responder applications that received the DPI work package send DPI work package responses that include status information of the responder applications processing the DPI work package. In some implementations, responder applications that send DPI work package responses include information in the DPI work package responses regarding which requesting ground values were evaluated by which responder applications.

At 1720, the DPI service evaluates the DPI work package responses. In some implementations, the DPI work package can either include a fake data subject or be a dedicated work package for requesting from responder applications which requesting grounds are handled by which responder applications. In these examples, the DPI service can evaluate the DPI work package responses to determine which requesting ground values are handled by which responder applications. In some implementations, the DPI service can evaluate work package responses and the information regarding which requesting ground values are considered by which responder application to determine whether each responder application that received the DPI work package has evaluated respective requesting ground values included in the DPI work package.

At 1722, the DPI service sends a response to the DPI protocol request that includes an overall status of DPI processing of the DPI protocol request.

Figure 18:
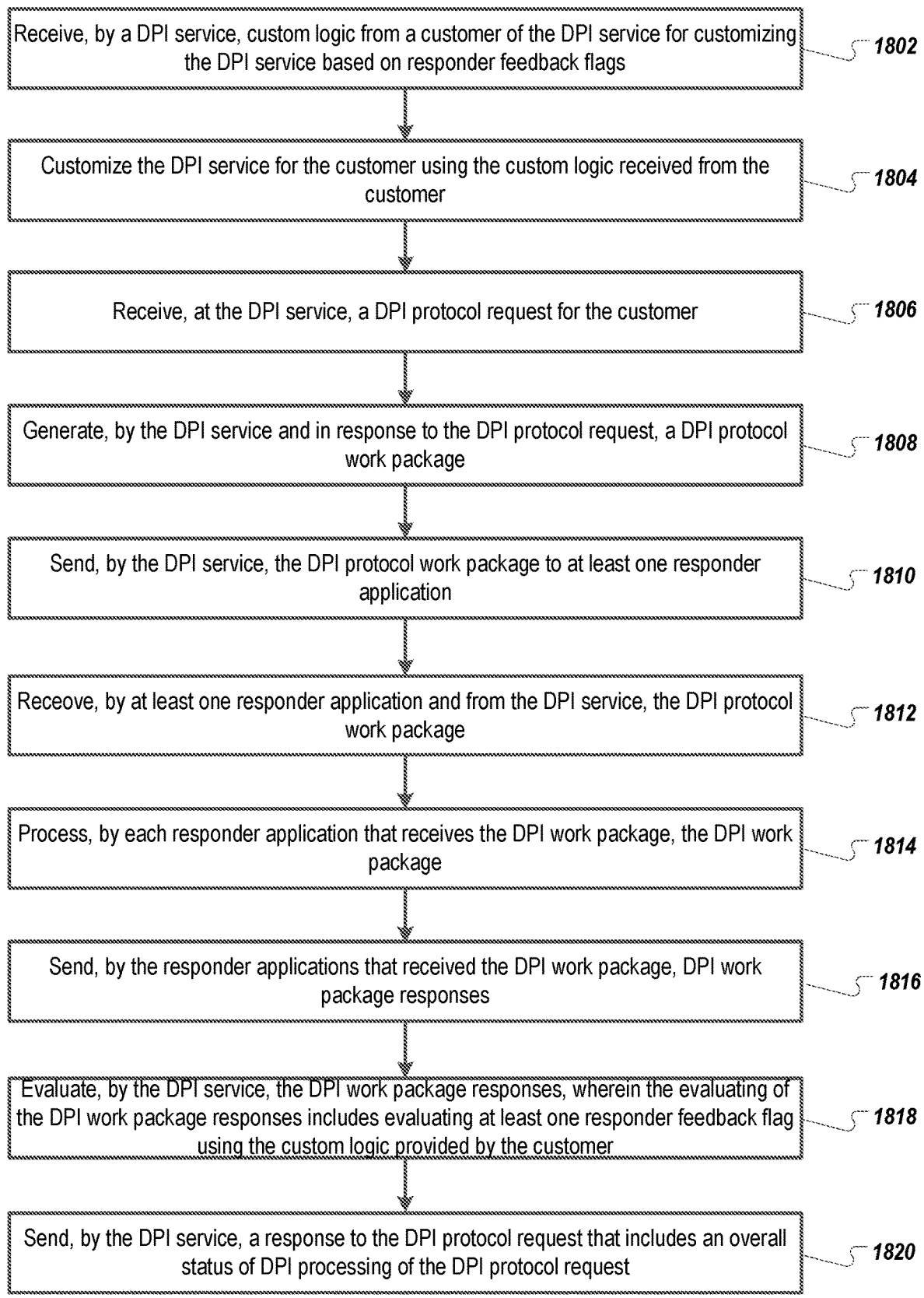

FIG. 18 is a flowchart of an example method 1800 for customizing DPI protocols. It will be understood that method 1800 and related methods may be performed, for example, by any suitable system, environment, software, and hardware, or a combination of systems, environments, software, and hardware, as appropriate. For example, one or more of a client, a server, or other computing device can be used to execute method 1800 and related methods and obtain any data from the memory of a client, the server, or the other computing device. In some implementations, the method 1800 and related methods are executed by one or more components of the system 100 described above with respect to FIG. 1. For example, the method 1800 and related methods can be executed by the server 102 of FIG. 1.

At 1802, a DPI service receives custom logic from a customer of the DPI service for customizing the DPI service based on responder feedback flags provided by responder applications. The DPI service services a multiple-application landscape that includes multiple responder applications that respond to DPI requests from the DPI service.

At 1804, the DPI service is customized for the customer using the custom logic received from the customer. Customizing the DPI service for the customer can include configuring an add-in to the DPI service for the customer using the custom logic received from the customer.

At 1806, the DPI service receives a DPI protocol request for the customer. The DPI protocol request can be an integrated end of purpose request for determining whether a consensus exists in the multiple-application landscape regarding whether at least one object can be blocked.

At 1808, the DPI service generates, in response to the DPI protocol request, a DPI protocol work package. The DPI work package can be a check work package that requests a responder application that receives the check work package to locally check whether objects in the DPI work package can be blocked by the responder application.

At 1810, the DPI service sends the DPI protocol work package to at least one responder application.

At 1812, at least one responder application receives, from the DPI service, the DPI protocol work package.

At 1814, each responder application that receives the DPI work package processes the DPI work package.

At 1816, the responder applications that received the DPI work package send DPI work package responses to the DPI service. At least one responder application includes in at least one work package response at least one responder feedback flag. A first responder feedback flag sent by a first responder application can provide information to the DPI service regarding why a first object cannot be blocked by the first responder application. The first responder feedback flag can inform the DPI service a type of data present in the first responder application that prevents the first responder application from being able to block the first object.

At 1818, the DPI service evaluates the DPI work package responses. The evaluating of the DPI work package responses includes evaluating at least one responder feedback flag using the custom logic provided by the customer. The evaluating by the DPI service of a first responder feedback flag using the custom logic provided by the customer of the DPI service can include one of a) pre-processing before the DPI service performs standard DPI processing of the DPI work package responses; b) post-processing after the DPI service performs the standard DPI processing; c) replacement processing performed instead of the standard DPI processing; or d) pre-processing before the standard DPI processing and post-processing after the standard DPI processing, wherein the standard DPI processing comprises processing configured for multiple customers of the DPI service and the custom logic comprises processing specific to the customer. The standard DPI processing can include determining an overall consensus vote for an object of can-block in response to determining that each responder application can block the object and an overall consensus vote for the object of cannot-block if at least one responder application cannot block the object. The DPI service can execute the custom logic as pre-processing and modify at least one DPI work package response for at least one responder application based on evaluating at least one responder feedback flag.

The DPI service can identify, while evaluating the at least one responder feedback flag, a scenario in which a first set of responder applications can block an object despite not all responders having indicated an ability to block the object. The DPI service can send a block command to the first set of responder applications in response to identifying the scenario in which the first set of responder applications can block the object despite not all responders having indicated an ability to block the object.

At 1820, the DPI service sends a response to the DPI protocol request that includes an overall status of DPI processing of the DPI protocol request.

As an example, a first responder feedback flag provided by a first responder application can inform the DPI service that objects in the DPI work package are to be blocked regardless of votes received by the DPI service from other responder applications. The DPI service can identify the first responder feedback flag from the first responder application that indicates that objects in the DPI work package are to be blocked regardless of votes received by the DPI service from other responder applications. The DPI service can change, in response to identifying the first responder feedback flag, any cannot-block votes in DPI work package responses to can-block votes. The DPI service can perform standard DPI processing of the DPI work package responses to determine a consensus can-block vote.

As another example, a first responder application can be used by a human administrator and the first responder application can provide information from the DPI work package to the human administrator. The first responder application can receive an indication from the human administrator that objects in the DPI work package should be blocked regardless of votes provided by other responder applications. The first responder application can include the first responder feedback flag in a first DPI work package response that informs the DPI service that objects in the DPI work package should be blocked regardless of votes provided by other responder applications.

At least one responder application can be customized to use custom logic received from the customer of the DPI service to evaluate at least one requesting ground value received from the DPI service in DPI protocol requests. The DPI service can send at least one requesting ground value in a DPI work package to responder applications. The responder applications can perform custom logic to evaluate the requesting ground value received from the DPI service. At least one responder application can send a responder feedback flag determined at least in part based on evaluation of a requesting ground value received from the DPI service and the DPI service can evaluate, using the custom logic provided by the customer, responder feedback flags determined by responders at least in part based on evaluation of a requesting ground value received by the DPI service.

As another example, the DPI service can receive, in response to a first work package and from a first responder application, a vote of can-block for an object along with a responder feedback flag requesting that the object not be blocked in the first responder application despite the first responder application being able to block the object. The DPI service can evaluate, using standard DPI processing, responses to the first work package including the can-block vote received from the first responder application. The DPI service can determine, based on the evaluating of the responses to the first work package, that the object can be blocked in the multiple application landscape. The DPI service can evaluate, in post-processing that occurs after the standard DPI processing, the responder feedback flag from the first responder application, where the evaluating of the responder feedback flag results in the prevention of a block command being sent to the first responder application for the object.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application Example 1. A computer-implemented method comprising:
receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;
customizing the DPI service for the customer using the custom logic received from the customer;
receiving, at the DPI service, a DPI protocol request for the customer;
generating, by the DPI service and in response to the DPI protocol request, a DPI protocol work package;
sending, by the DPI service, the DPI protocol work package to at least one responder application;
receiving, by at least one responder application and from the DPI service, the DPI protocol work package;
processing, by each responder application that receives the DPI work package, the DPI work package;
sending, by the responder applications that received the DPI work package, DPI work package responses, wherein at least one responder application includes in at least one work package response at least one responder feedback flag;
evaluating, by the DPI service, the DPI work package responses, wherein the evaluating of the DPI work package responses includes evaluating at least one responder feedback flag using the custom logic provided by the customer; and sending, by the DPI service, a response to the DPI protocol request that includes an overall status of DPI processing of the DPI protocol request.

Example 2. The Example of claim 1, wherein customizing the DPI service for the customer comprises configuring an add-in to the DPI service for the customer using the custom logic received from the customer.

Example 3. The Example of any of the preceding examples, wherein the DPI protocol request is an integrated end of purpose request for determining whether a consensus exists in the multiple-application landscape regarding whether at least one object can be blocked.

Example 4. The Example of any of the preceding examples, wherein the DPI work package is a check work package that requests a responder application that receives the check work package to locally check whether objects in the DPI work package can be blocked by the responder application.

Example 5. The Example of any of the preceding examples, wherein the evaluating by the DPI service of a first responder feedback flag using the custom logic provided by the customer of the DPI service comprises one of a) pre-processing before the DPI service performs standard DPI processing of the DPI work package responses; b) post-processing after the DPI service performs the standard DPI processing; c) replacement processing performed instead of the standard DPI processing; or d) pre-processing before the standard DPI processing and post-processing after the standard DPI processing, wherein the standard DPI processing comprises processing configured for multiple customers of the DPI service and the custom logic comprises processing specific to the customer.

Example 6. The Example of any of the preceding examples, wherein the standard DPI processing comprises determining an overall consensus vote for an object of can-block in response to determining that each responder application can block the object and an overall consensus vote for the object of cannot-block if at least one responder application cannot block the object.

Example 7. The Example of any of the preceding examples, wherein the DPI service identifies, while evaluating the at least one responder feedback flag, a scenario in which a first set of responder applications can block an object despite not all responders having indicated an ability to block the object.

Example 8. The Example of any of the preceding examples, further comprising sending, by the DPI service, a block command to the first set of responder applications in response to identifying the scenario in which the first set of responder applications can block the object despite not all responders having indicated an ability to block the object.

Example 9. The Example of any of the preceding examples, wherein the DPI service executes the custom logic as pre-processing and modifies at least one DPI work package response for at least one responder application based on evaluating at least one responder feedback flag.

Example 10. The Example of any of the preceding examples, wherein a first responder feedback flag provided by a first responder application informs the DPI service that objects in the DPI work package are to be blocked regardless of votes received by the DPI service from other responder applications.

Example 11. The Example of any of the preceding examples, wherein:
the custom logic comprises pre-processing performed before standard DPI processing of the DPI work package responses; and
evaluating, by the DPI service, the DPI work package responses includes:
identifying the first responder feedback flag from the first responder application that indicates that objects in the DPI work package are to be blocked regardless of votes received by the DPI service from other responder applications;
changing, in response to identifying the first responder feedback flag, any cannot-block votes in DPI work package responses to can-block votes; and
performing standard DPI processing of the DPI work package responses to determine a consensus can-block vote.

Example 12. The Example of any of the preceding examples, wherein:
the first responder application is used by a human administrator;
the first responder application provides information from the DPI work package to the human administrator;
the first responder application receives an indication from the human administrator that objects in the DPI work package should be blocked regardless of votes provided by other responder applications; and
the first responder application includes the first responder feedback flag in a first DPI work package response that informs the DPI service that objects in the DPI work package should be blocked regardless of votes provided by other responder applications.

Example 13. The Example of any of the preceding examples, wherein a first responder feedback flag sent by a first responder application provides information to the DPI service regarding why a first object cannot be blocked by the first responder application.

Example 14. The Example of any of the preceding examples, wherein the first responder feedback flag informs the DPI service a type of data present in the first responder application that prevents the first responder application from being able to block the first object.

Example 15. The Example of any of the preceding examples, further comprising customizing at least one responder application to use custom logic received from the customer of the DPI service to evaluate at least one requesting ground value received from the DPI service in DPI protocol requests.

Example 16. The Example of any of the preceding examples, further comprising:
  sending, by the DPI service, at least one requesting ground value in a DPI work package;
  performing, by at least one responder application, custom logic to evaluate the requesting ground value received from the DPI service; and
  sending, by at least one responder application, a responder feedback flag determined at least in part based on evaluation of a requesting ground value received from the DPI service; and
  evaluating, by the DPI service, using the custom logic provided by the customer, responder feedback flags determined by responders at least in part based on evaluation of a requesting ground value received by the DPI service.

Example 17. The Example of any of the preceding examples, further comprising:
  receiving, by the DPI service, in response to a first work package and from a first responder application, a vote of can-block for an object along with a responder feedback flag requesting that the object not be blocked in the first responder application despite the first responder application being able to block the object;
  evaluating, by the DPI service, using standard DPI processing, responses to the first work package including the vote of can-block received from the first responder application;
  determining, based on the evaluating of the responses to the first work package, that the object can be blocked in the multiple-application landscape; and
  evaluating, in post-processing that occurs after the standard DPI processing, the responder feedback flag from the first responder application, wherein the evaluating of the responder feedback flag results in prevention of a block command being sent to the first responder application for the object.

Example 18. A system comprising:
  one or more computers; and
  a computer-readable medium coupled to the one or more computers having instructions stored thereon which, when executed by the one or more computers, cause the one or more computers to perform operations comprising:
    receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;
    customizing the DPI service for the customer using the custom logic received from the customer;
    receiving, at the DPI service, a DPI protocol request for the customer;
    generating, by the DPI service and in response to the DPI protocol request, a DPI protocol work package;
    sending, by the DPI service, the DPI protocol work package to at least one responder application;
    receiving, by at least one responder application and from the DPI service, the DPI protocol work package;
    processing, by each responder application that receives the DPI work package, the DPI work package;
    sending, by the responder applications that received the DPI work package, DPI work package responses, wherein at least one responder application includes in at least one work package response at least one responder feedback flag;
    evaluating, by the DPI service, the DPI work package responses, wherein the evaluating of the DPI work package responses includes evaluating at least one responder feedback flag using the custom logic provided by the customer; and
    sending, by the DPI service, a response to the DPI protocol request that includes an overall status of DPI processing of the DPI protocol request.

Example 19. The Example of claim 18, wherein customizing the DPI service for the customer comprises configuring an add-in to the DPI service for the customer using the custom logic received from the customer.

Example 20. A non-transitory, computer-readable medium coupled to one or more processors and having instructions stored thereon which, when executed by the one or more processors, cause the one or more processors to perform operations, the operations comprising:
  receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;
  customizing the DPI service for the customer using the custom logic received from the customer;
  receiving, at the DPI service, a DPI protocol request for the customer;
  generating, by the DPI service and in response to the DPI protocol request, a DPI protocol work package;
  sending, by the DPI service, the DPI protocol work package to at least one responder application;
  receiving, by at least one responder application and from the DPI service, the DPI protocol work package;
  processing, by each responder application that receives the DPI work package, the DPI work package;
  sending, by the responder applications that received the DPI work package, DPI work package responses, wherein at least one responder application includes in at least one work package response at least one responder feedback flag;
  evaluating, by the DPI service, the DPI work package responses, wherein the evaluating of the DPI work package responses includes evaluating at least one responder feedback flag using the custom logic provided by the customer; and
  sending, by the DPI service, a response to the DPI protocol request that includes an overall status of DPI processing of the DPI protocol request.

What is claimed is:

1. A computer-implemented method comprising:
   receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;
   customizing the DPI service for the customer using the custom logic received from the customer;
   receiving, at the DPI service, a DPI protocol request for the customer;
   generating, by the DPI service and in response to the DPI protocol request, a DPI protocol work package;
   sending, by the DPI service, the DPI protocol work package to at least one responder application;
   receiving, by at least one responder application and from the DPI service, the DPI protocol work package;
   processing, by each responder application that receives the DPI work package, the DPI work package;
   sending, by the responder applications that received the DPI work package, DPI work package responses, wherein at least one responder application includes in at least one work package response at least one responder feedback flag;
   evaluating, by the DPI service, the DPI work package responses, wherein the evaluating of the DPI work package responses includes evaluating at least one responder feedback flag using the custom logic provided by the customer; and
   sending, by the DPI service, a response to the DPI protocol request that includes an overall status of DPI processing of the DPI protocol request.

2. The computer-implemented method of claim 1, wherein customizing the DPI service for the customer comprises configuring an add-in to the DPI service for the customer using the custom logic received from the customer.

3. The computer-implemented method of claim 1, wherein the DPI protocol request is an integrated end of purpose request for determining whether a consensus exists in the multiple-application landscape regarding whether at least one object can be blocked.

4. The computer-implemented method of claim 3, wherein the DPI work package is a check work package that requests a responder application that receives the check work package to locally check whether objects in the DPI work package can be blocked by the responder application.

5. The computer-implemented method of claim 4, wherein the evaluating by the DPI service of a first responder feedback flag using the custom logic provided by the customer of the DPI service comprises one of a) pre-processing before the DPI service performs standard DPI processing of the DPI work package responses; b) post-processing after the DPI service performs the standard DPI processing; c) replacement processing performed instead of the standard DPI processing; or d) pre-processing before the standard DPI processing and post-processing after the standard DPI processing, wherein the standard DPI processing comprises processing configured for multiple customers of the DPI service and the custom logic comprises processing specific to the customer.

6. The computer-implemented method of claim 5, wherein the standard DPI processing comprises determining an overall consensus vote for an object of can-block in response to determining that each responder application can block the object and an overall consensus vote for the object of cannot-block if at least one responder application cannot block the object.

7. The computer-implemented method of claim 6, wherein the DPI service identifies, while evaluating the at least one responder feedback flag, a scenario in which a first set of responder applications can block an object despite not all responders having indicated an ability to block the object.

8. The computer-implemented method of claim 7, further comprising sending, by the DPI service, a block command to the first set of responder applications in response to identifying the scenario in which the first set of responder applications can block the object despite not all responders having indicated an ability to block the object.

9. The computer-implemented method of claim 7, wherein the DPI service executes the custom logic as pre-processing and modifies at least one DPI work package response for at least one responder application based on evaluating at least one responder feedback flag.

10. The computer-implemented method of claim 3, wherein a first responder feedback flag sent by a first responder application provides information to the DPI service regarding why a first object cannot be blocked by the first responder application.

11. The computer-implemented method of claim 10, wherein the first responder feedback flag informs the DPI service a type of data present in the first responder application that prevents the first responder application from being able to block the first object.

12. The computer-implemented method of claim 3, further comprising:
    receiving, by the DPI service, in response to a first work package and from a first responder application, a vote of can-block for an object along with a responder feedback flag requesting that the object not be blocked in the first responder application despite the first responder application being able to block the object;
    evaluating, by the DPI service, using standard DPI processing, responses to the first work package including the vote of can-block received from the first responder application;
    determining, based on the evaluating of the responses to the first work package, that the object can be blocked in the multiple-application landscape; and
    evaluating, in post-processing that occurs after the standard DPI processing, the responder feedback flag from the first responder application, wherein the evaluating of the responder feedback flag results in prevention of a block command being sent to the first responder application for the object.

13. The computer-implemented method of claim 1, wherein a first responder feedback flag provided by a first responder application informs the DPI service that objects in the DPI work package are to be blocked regardless of votes received by the DPI service from other responder applications.

14. The computer-implemented method of claim 13, wherein:
    the custom logic comprises pre-processing performed before standard DPI processing of the DPI work package responses; and
    evaluating, by the DPI service, the DPI work package responses includes:
        identifying the first responder feedback flag from the first responder application that indicates that objects in the DPI work package are to be blocked regardless of votes received by the DPI service from other responder applications;

changing, in response to identifying the first responder feedback flag, any cannot-block votes in DPI work package responses to can-block votes; and performing standard DPI processing of the DPI work package responses to determine a consensus can-block vote.

15. The computer-implemented method of claim 13, wherein:

the first responder application is used by a human administrator;

the first responder application provides information from the DPI work package to the human administrator;

the first responder application receives an indication from the human administrator that objects in the DPI work package should be blocked regardless of votes provided by other responder applications; and the first responder application includes the first responder feedback flag in a first DPI work package response that informs the DPI service that objects in the DPI work package should be blocked regardless of votes provided by other responder applications.

16. The computer-implemented method of claim 1, further comprising customizing at least one responder application to use custom logic received from the customer of the DPI service to evaluate at least one requesting ground value received from the DPI service in DPI protocol requests.

17. The computer-implemented method of claim 1, further comprising:

sending, by the DPI service, at least one requesting ground value in a DPI work package;

performing, by at least one responder application, custom logic to evaluate the requesting ground value received from the DPI service; and sending, by at least one responder application, a responder feedback flag determined at least in part based on evaluation of a requesting ground value received from the DPI service; and evaluating, by the DPI service, using the custom logic provided by the customer, responder feedback flags determined by responders at least in part based on evaluation of a requesting ground value received by the DPI service.

18. A system comprising:

one or more computers; and a computer-readable medium coupled to the one or more computers having instructions stored thereon which, when executed by the one or more computers, cause the one or more computers to perform operations comprising:

receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;

customizing the DPI service for the customer using the custom logic received from the customer;

receiving, at the DPI service, a DPI protocol request for the customer;

generating, by the DPI service and in response to the DPI protocol request, a DPI protocol work package;

sending, by the DPI service, the DPI protocol work package to at least one responder application;

receiving, by at least one responder application and from the DPI service, the DPI protocol work package;

processing, by each responder application that receives the DPI work package, the DPI work package;

sending, by the responder applications that received the DPI work package, DPI work package responses, wherein at least one responder application includes in at least one work package response at least one responder feedback flag;

evaluating, by the DPI service, the DPI work package responses, wherein the evaluating of the DPI work package responses includes evaluating at least one responder feedback flag using the custom logic provided by the customer; and sending, by the DPI service, a response to the DPI protocol request that includes an overall status of DPI processing of the DPI protocol request.

19. The system of claim 18, wherein customizing the DPI service for the customer comprises configuring an add-in to the DPI service for the customer using the custom logic received from the customer.

20. A non-transitory, computer-readable medium coupled to one or more processors and having instructions stored thereon which, when executed by the one or more processors, cause the one or more processors to perform operations, the operations comprising:

receiving, by a DPI (Data Privacy Integration) service servicing a multiple-application landscape that includes multiple responder applications that respond to DPI requests from the DPI service, custom logic from a customer of the DPI service for customizing the DPI service based on responder feedback flags provided by responder applications;

customizing the DPI service for the customer using the custom logic received from the customer;

receiving, at the DPI service, a DPI protocol request for the customer;

generating, by the DPI service and in response to the DPI protocol request, a DPI protocol work package;

sending, by the DPI service, the DPI protocol work package to at least one responder application;

receiving, by at least one responder application and from the DPI service, the DPI protocol work package;

processing, by each responder application that receives the DPI work package, the DPI work package;

sending, by the responder applications that received the DPI work package, DPI work package responses, wherein at least one responder application includes in at least one work package response at least one responder feedback flag;

evaluating, by the DPI service, the DPI work package responses, wherein the evaluating of the DPI work package responses includes evaluating at least one responder feedback flag using the custom logic provided by the customer; and sending, by the DPI service, a response to the DPI protocol request that includes an overall status of DPI processing of the DPI protocol request.

* * * * *